(12) United States Patent
Suzaki et al.

(10) Patent No.: US 8,154,801 B2
(45) Date of Patent: Apr. 10, 2012

(54) ZOOM LENS AND IMAGING APPARATUS

(75) Inventors: Mitsuhiro Suzaki, Tokyo (JP); Shinichi Arita, Tokyo (JP); Takuya Anzawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 12/801,615

(22) Filed: Jun. 17, 2010

(65) Prior Publication Data

US 2011/0007396 A1 Jan. 13, 2011

(30) Foreign Application Priority Data

Jul. 13, 2009 (JP) ................................. 2009-164570

(51) Int. Cl.
*G02B 27/64* (2006.01)
*G02B 15/14* (2006.01)
(52) U.S. Cl. ...................... 359/557; 359/554; 359/676
(58) Field of Classification Search .......... 359/554–557, 359/676–690
See application file for complete search history.

(56) References Cited

U.S. PATENT DOCUMENTS

| 5,202,992 | A | * | 4/1993 | Banno et al. | 359/676 |
| 2007/0263299 | A1 | * | 11/2007 | Ohtake | 359/774 |
| 2008/0094709 | A1 | * | 4/2008 | Iwasawa | 359/557 |
| 2008/0212184 | A1 | * | 9/2008 | Ohtake | 359/557 |
| 2010/0202053 | A1 | * | 8/2010 | Toyoda | 359/557 |

FOREIGN PATENT DOCUMENTS

| JP | 2005-181635 | 7/2005 |
| JP | 2006-071993 A | 3/2006 |

* cited by examiner

*Primary Examiner* — Thong Nguyen
(74) *Attorney, Agent, or Firm* — Rader, Fishman & Grauer PLLC

(57) ABSTRACT

A zoom lens includes, in order from an object side to an image side: a first lens group that has a positive refractive power and remains stationary in a direction of an optical axis; a second lens group that has a negative refractive power and is movable on the optical axis so as to perform a zoom operation; a third lens group that has a positive refractive power and remains stationary in the direction of the optical axis during zooming and focusing; a fourth lens group that has a positive refractive power and is movable on the optical axis so as to correct fluctuation in imaging position and correct change in imaging position caused by change in object distance; and a fifth lens group that has a positive refractive power and remains stationary in the direction of the optical axis.

10 Claims, 30 Drawing Sheets

COMATIC ABERRATION

COMATIC ABERRATION

COMATIC ABERRATION

COMATIC ABERRATION

COMATIC ABERRATION

COMATIC ABERRATION

COMATIC ABERRATION

COMATIC ABERRATION

COMATIC ABERRATION

COMATIC ABERRATION

ZOOM LENS AND IMAGING APPARATUS

BACKGROUND OF THE INVENTION

1. Field of the Invention

The present invention relates to a zoom lens and an imaging apparatus appropriately used particularly for electronic cameras, such as video cameras and digital still cameras, and film cameras. Specifically, the invention relates to the technical field of the zoom lens and imaging apparatus capable of optically correcting the image blur caused by hand shake at the time of photography and achieving miniaturization and high zoom power.

2. Description of the Related Art

Recently, the imaging apparatuses such as video cameras and digital cameras using a solid-state imaging device such as a CCD (Charge Coupled Device) or a CMOS (Complementary Metal-Oxide Semiconductor) have come into widespread use.

As the imaging apparatuses have spread, the demand for high image quality has increased. In particular, there is demand for photographic lenses, particularly, zoom lenses, which have an excellent imaging performance, adapted to the solid-state imaging devices having a large number of pixels. Further, the demand for the miniaturization of the imaging apparatus is also strong, and there is the demand for the small-sized and high-performance zoom lens. Moreover, the demand for the high zoom power is also strong, and the image blur as an adverse effect of a high-zoom-power configuration may occur at the time of photography. For this reason, the demand for the high-power zoom lens having a hand shake correction function has been strong.

In the zoom lens disclosed in JP-A-2005-181635, miniaturization is achieved in a way that the prism deflecting the optical path is disposed in the optical system. In addition, the zoom ratio of four times or more is achieved by adopting a lens configuration having four variable power groups.

Likewise, in the zoom lens disclosed in JP-A-2006-71993, miniaturization in the direction of the optical axis is achieved in such a way that the prism is disposed in the optical system.

In the zoom lenses disclosed in JP-A-2005-181635 and JP-A-2006-71993, in order to increase a zoom power, it is necessary to significantly increase the sizes of the lens (the front lens) and the prism arranged to be closest to the object side of the first lens group. For this reason, it is difficult to achieve miniaturization.

Further, in the zoom lens disclosed in JP-A-2005-181635, the zoom ratio of four times or more is achieved. In the lens configuration having four variable power groups, the sixth lens group is further provided, thereby correcting aberrations. Accordingly, a problem arises in that it is difficult to shorten the entire length of the optical system.

Moreover, in the zoom lens disclosed in JP-A-2005-181635, in order to further increase a zoom power, it is necessary to increase shift amounts of the second lens group and the fourth lens group. For this reason, it is difficult to achieve miniaturization in the direction of the optical axis.

In addition, in the zoom lens disclosed in JP-A-2006-71993, the zoom ratio is small, about three times, or so is achieved and it is difficult to satisfy the demand for high zoom power.

Thus, it is desirable to provide a zoom lens and an imaging apparatus securing the favorable hand shake correction function and achieving miniaturization and a high zoom power.

SUMMARY OF THE INVENTION

According to one embodiment of the invention, there is provided a zoom lens including, in order from an object side to an image side: a first lens group that has a positive refractive power and remains stationary in a direction of an optical axis; a second lens group that has a negative refractive power and is movable on the optical axis so as to perform a zoom operation; a third lens group that has a positive refractive power and remains stationary in the direction of the optical axis during zooming and focusing; a fourth lens group that has a positive refractive power and is movable on the optical axis so as to correct fluctuation in imaging position and correct change in imaging position caused by change in object distance; and a fifth lens group that has a positive refractive power and remains stationary in the direction of the optical axis. The fifth lens group includes, in order from the object side to the image side, a first lens that has a negative refractive power and remains stationary in the direction of the optical axis, and a second lens that has a positive refractive power and is movable in a direction perpendicular to the direction of the optical axis. By moving the second lens of the fifth lens group in the direction perpendicular to the direction of the optical axis, an image formed on an image plane can be shifted in the direction perpendicular to the direction of the optical axis. The following conditional expressions (1) to (4) are satisfied.

$$1.0 < f3/f4 < 2.0, \tag{1}$$

$$0.25 < |\beta 2w| < 0.4, \tag{2}$$

$$-0.065 < H1'/f1 < -0.045, \text{ and} \tag{3}$$

$$1.1 < \beta 5 < 1.7, \tag{4}$$

where f3 is a composite focal length of the third lens group, f4 is a composite focal length of the fourth lens group, β2w is an imaging magnification of the second lens group in a wide-angle end state, H1' is a space between a vertex of a surface of the first lens group closest to the image side and a principal point of the first lens group close to the image side (the sign "−" represents the object side and the sign "+" represents the image side), f1 is a composite focal length of the first lens group, and β5 is an imaging magnification of the fifth lens group.

Accordingly, in the zoom lens according to this embodiment, it is possible to correct the image blur and satisfactorily correct aberrations in the zoom range by using the second lens of the fifth lens group.

In the zoom lens according to this embodiment, it is preferable to satisfy the following conditional expression (5).

$$0.3 < f5p/ft < 0.7 \tag{5}$$

where f5p is a focal length of the second lens of the fifth lens group, and ft is a focal length of the whole lens system in a telephoto end state.

By making the zoom lens according to this embodiment satisfy the conditional expression (5), it is possible to prevent the off-axis rays from being far away from the optical axis, and it is possible to suppress deterioration in the blur correction coefficient.

In the zoom lens according to this embodiment, it is preferable to satisfy the following conditional expression (6).

$$-1.0 < f5n/f5p < -0.5, \tag{6}$$

where f5n is a focal length of the first lens of the fifth lens group.

By making the zoom lens according to this embodiment satisfy the conditional expression (6), it is possible to reduce the difference between the refractive powers of the first lens and the second lens in the fifth lens group.

In the zoom lens according to this embodiment, it is preferable that the first lens and the second lens of the fifth lens group should be made of resin, and it is also preferable to satisfy the following conditional expressions (7) and (8).

$$v5a < 42, \text{ and} \tag{7}$$

$$v5b > 55, \tag{8}$$

where v5a is an Abbe number of the first lens of the fifth lens group at the d-line, and v5b is an Abbe number of the second lens of the fifth lens group at the d-line.

By making the zoom lens according to this embodiment satisfy the conditional expressions (7) and (8), it is possible to effectively correct on-axis chromatic aberration and off-axis chromatic aberration in the whole zoom range.

According to another embodiment of the invention, there is provided an imaging apparatus including: a zoom lens; and an imaging device that converts an optical image, which is formed by the zoom lens, into an electric signal. The zoom lens includes, in order from an object side to an image side: a first lens group that has a positive refractive power and remains stationary in a direction of an optical axis; a second lens group that has a negative refractive power and is movable on the optical axis so as to perform a zoom operation; a third lens group that has a positive refractive power and remains stationary in the direction of the optical axis during zooming and focusing; a fourth lens group that has a positive refractive power and is movable on the optical axis so as to correct fluctuation in imaging position and correct change in imaging position caused by change in object distance; and a fifth lens group that has a positive refractive power and remains stationary in the direction of the optical axis. The fifth lens group includes, in order from the object side to the image side, a first lens that has a negative refractive power and remains stationary in the direction of the optical axis, and a second lens that has a positive refractive power and is movable in a direction perpendicular to the direction of the optical axis. By moving the second lens of the fifth lens group in the direction perpendicular to the direction of the optical axis, an image formed on an image plane can be shifted in the direction perpendicular to the direction of the optical axis.

The following conditional expressions (1) to (4) are satisfied.

$$1.0 < f3/f4 < 2.0, \tag{1}$$

$$0.25 < |\beta 2w| < 0.4, \tag{2}$$

$$-0.065 < H1'/f1 < -0.045, \text{ and} \tag{3}$$

$$1.1 < \beta 5 < 1.7, \tag{4}$$

where f3 is a composite focal length of the third lens group, f4 is a composite focal length of the fourth lens group, β2w is an imaging magnification of the second lens group in a wide-angle end state, H1' is a space between a vertex of a surface of the first lens group closest to the image side and a principal point of the first lens group close to the image side (the sign "−" represents the object side and the sign "+" represents the image side), f1 is a composite focal length of the first lens group, and β5 is an imaging magnification of the fifth lens group.

Accordingly, in the imaging apparatus according to this embodiment, it is possible to correct the image blur and satisfactorily correct aberrations in the zoom range by using the second lens of the fifth lens group.

According to still another embodiment of the invention, there is provided a zoom lens including, in order from an object side to an image side: a first lens group that has a positive refractive power and remains stationary in a direction of an optical axis; a second lens group that has a negative refractive power and is movable on the optical axis so as to perform a zoom operation; a third lens group that has a positive refractive power and remains stationary in the direction of the optical axis during zooming and focusing; a fourth lens group that has a positive refractive power and is movable on the optical axis so as to correct fluctuation in imaging position and correct change in imaging position caused by change in object distance; and a fifth lens group that has a negative refractive power and remains stationary in the direction of the optical axis. The fifth lens group includes, in order from the object side to the image side, a first lens that has a negative refractive power and remains stationary in the direction of the optical axis, and a second lens that has a positive refractive power and is movable in a direction perpendicular to the direction of the optical axis. By moving the second lens of the fifth lens group in the direction perpendicular to the direction of the optical axis, an image formed on an image plane can be shifted in the direction perpendicular to the direction of the optical axis. The following conditional expressions (1) to (4) are satisfied.

$$1.0 < f3/f4 < 2.0, \tag{1}$$

$$0.25 < |\beta 2w| < 0.4, \tag{2}$$

$$-0.065 < H1'/f1 < -0.045, \text{ and} \tag{3}$$

$$1.1 < \beta 5 < 1.7, \tag{4}$$

where f3 is a composite focal length of the third lens group, f4 is a composite focal length of the fourth lens group, β2w is an imaging magnification of the second lens group in a wide-angle end state, H1' is a space between a vertex of a surface of the first lens group closest to the image side and a principal point of the first lens group close to the image side (the sign "−" represents the object side and the sign "+" represents the image side), f1 is a composite focal length of the first lens group, and β5 is an imaging magnification of the fifth lens group.

Accordingly, in the zoom lens according to this embodiment, it is possible to correct the image blur and satisfactorily correct aberrations in the zoom range by using the second lens of the fifth lens group.

In the zoom lens according to this embodiment, it is preferable to satisfy the following conditional expression (5).

$$0.3 < f5p/ft < 0.7 \tag{5}$$

where f5p is a focal length of the second lens of the fifth lens group, and ft is a focal length of the whole lens system in a telephoto end state.

By making the zoom lens according to this embodiment satisfy the conditional expression (5), it is possible to prevent the off-axis rays from being far away from the optical axis, and it is possible to suppress deterioration in the blur correction coefficient.

In the zoom lens according to this embodiment, it is preferable to satisfy the following conditional expression (6).

$$-1.0 < f5n/f5p < -0.5, \quad (6)$$

where f5n is a focal length of the first lens of the fifth lens group.

By making the zoom lens according to this embodiment satisfy the conditional expression (6), it is possible to reduce the difference between the refractive powers of the first lens and the second lens in the fifth lens group.

In the zoom lens according to this embodiment, it is preferable that the first lens and the second lens of the fifth lens group should be made of resin, and it is also preferable to satisfy the following conditional expressions (7) and (8).

$$v5a < 42, \text{ and} \quad (7)$$

$$v5b > 55, \quad (8)$$

where v5a is an Abbe number of the first lens of the fifth lens group at the d-line, and v5b is an Abbe number of the second lens of the fifth lens group at the d-line.

By making the zoom lens according to this embodiment satisfy the conditional expressions (7) and (8), it is possible to effectively correct on-axis chromatic aberration and off-axis chromatic aberration in the whole zoom range.

According to yet another embodiment of the invention, there is provided an imaging apparatus including: a zoom lens; and an imaging device that converts an optical image, which is formed by the zoom lens, into an electric signal. The zoom lens includes, in order from an object side to an image side: a first lens group that has a positive refractive power and remains stationary in a direction of an optical axis; a second lens group that has a negative refractive power and is movable on the optical axis so as to perform a zoom operation; a third lens group that has a positive refractive power and remains stationary in the direction of the optical axis during zooming and focusing; a fourth lens group that has a positive refractive power and is movable on the optical axis so as to correct fluctuation in imaging position and correct change in imaging position caused by change in object distance; and a fifth lens group that has a negative refractive power and remains stationary in the direction of the optical axis. The fifth lens group includes, in order from the object side to the image side, a first lens that has a negative refractive power and remains stationary in the direction of the optical axis, and a second lens that has a positive refractive power and is movable in a direction perpendicular to the direction of the optical axis. By moving the second lens of the fifth lens group in the direction perpendicular to the direction of the optical axis, an image formed on an image plane can be shifted in the direction perpendicular to the direction of the optical axis.

The following conditional expressions (1) to (4) are satisfied.

$$1.0 < f3/f4 < 2.0, \quad (1)$$

$$0.25 < |\beta 2w| < 0.4, \quad (2)$$

$$-0.065 < H1'/f1 < -0.045, \text{ and} \quad (3)$$

$$1.1 < \beta 5 < 1.7, \quad (4)$$

where f3 is a composite focal length of the third lens group, f4 is a composite focal length of the fourth lens group, β2w is an imaging magnification of the second lens group in a wide-angle end state, H1' is a space between a vertex of a surface of the first lens group closest to the image side and a principal point of the first lens group close to the image side (the sign "−" represents the object side and the sign "+" represents the image side), f1 is a composite focal length of the first lens group, and β5 is an imaging magnification of the fifth lens group.

Accordingly, in the imaging apparatus according to this embodiment, it is possible to correct the image blur and satisfactorily correct aberrations in the zoom range by using the second lens of the fifth lens group.

In the one embodiment of the invention, the zoom lens includes, in order from an object side to an image side: the first lens group that has a positive refractive power and remains stationary in the direction of the optical axis; a second lens group that has a negative refractive power and is movable on the optical axis so as to perform the zoom operation; a third lens group that has a positive refractive power and remains stationary in the direction of the optical axis during zooming and focusing; a fourth lens group that has a positive refractive power and is movable on the optical axis so as to correct fluctuation in imaging position and correct change in imaging position caused by change in object distance; and a fifth lens group that has a negative refractive power and remains stationary in the direction of the optical axis. The fifth lens group includes, in order from the object side to the image side, a first lens that has a negative refractive power and remains stationary in the direction of the optical axis, and a second lens that has a positive refractive power and is movable in a direction perpendicular to the direction of the optical axis. By moving the second lens of the fifth lens group in the direction perpendicular to the direction of the optical axis, an image formed on the image plane can be shifted in the direction perpendicular to the direction of the optical axis. The following conditional expressions (1) to (4) are satisfied.

$$1.0 < f3/f4 < 2.0, \quad (1)$$

$$0.25 < |\beta 2w| < 0.4, \quad (2)$$

$$-0.065 < H1'/f1 < -0.045, \text{ and} \quad (3)$$

$$1.1 < \beta 5 < 1.7, \quad (3)$$

where f3 is the composite focal length of the third lens group, f4 is the composite focal length of the fourth lens group, β2w is the imaging magnification of the second lens group in the wide-angle end state, H1' is the space between the vertex of the surface of the first lens group closest to the image side and a principal point of the first lens group close to the image side (the sign "−" represents the object side and the sign "+" represents the image side), f1 is the composite focal length of the first lens group, and β5 is the imaging magnification of the fifth lens group.

Accordingly, it is possible to secure a favorable hand shake correction function and achieve miniaturization and a high zoom power.

In the one embodiment of the invention, the zoom lens is configured to satisfy the following conditional expression (5).

$$0.3 < f5p/ft < 0.7 \quad (5)$$

where f5p is a focal length of the second lens of the fifth lens group, and ft is a focal length of the whole lens system in a telephoto end state.

Accordingly, it is possible to satisfactorily correct fluctuation in comatic aberration caused when the second lens is shifted in the direction perpendicular to the direction of the optical axis. In addition, it is possible to reduce the size of the driving apparatus by reducing the shift amount of the lens and reduce the size of the lens system by shortening the entire length of the optical system.

In the one embodiment of the invention, the zoom lens is configured to satisfy the following conditional expression (6).

$$-1.0 < f5n/f5p < -0.5, \quad (6)$$

where f5n is a focal length of the first lens of the fifth lens group.

Accordingly, it is possible to suppress the deterioration of the imaging performance caused by the relative eccentricity of the first lens and the second lens.

In the one embodiment of the invention, the zoom lens is configured so that the first lens and the second lens of the fifth lens group are made of resin. In addition, the zoom lens is configured to satisfy the conditional expressions (7) and (8).

Accordingly, it is possible to reduce the fluctuation in back focal length at the time of temperature change, and it is also possible to suppress occurrence of chromatic aberration.

In the another embodiment of the invention, the imaging apparatus includes: the zoom lens; and the imaging device that converts an optical image, which is formed by the zoom lens, into an electric signal. The zoom lens includes, in order from an object side to an image side: the first lens group that has a positive refractive power and remains stationary in the direction of the optical axis; the second lens group that has a negative refractive power and is movable on the optical axis so as to perform the zoom operation; the third lens group that has a positive refractive power and remains stationary in the direction of the optical axis during zooming and focusing; the fourth lens group that has a positive refractive power and is movable on the optical axis so as to correct fluctuation in imaging position and correct change in imaging position caused by change in object distance; and the fifth lens group that has a positive refractive power and remains stationary in the direction of the optical axis. The fifth lens group includes, in order from the object side to the image side, a first lens that has a negative refractive power and remains stationary in the direction of the optical axis, and a second lens that has a positive refractive power and is movable in a direction perpendicular to the direction of the optical axis. By moving the second lens of the fifth lens group in the direction perpendicular to the direction of the optical axis, an image formed on the image plane can be shifted in the direction perpendicular to the direction of the optical axis. The following conditional expressions (1) to (4) are satisfied.

$$1.0 < f3/f4 < 2.0, \quad (1)$$

$$0.25 < |\beta 2w| < 0.4, \quad (2)$$

$$-0.065 < H1'/f1 < -0.045, \text{ and} \quad (3)$$

$$1.1 < \beta 5 < 1.7, \quad (4)$$

where f3 is the composite focal length of the third lens group,
f4 is the composite focal length of the fourth lens group,
β2w is the imaging magnification of the second lens group in the wide-angle end state,
H1' is the space between the vertex of the surface of the first lens group closest to the image side and a principal point of the first lens group close to the image side (the sign "−" represents the object side and the sign "+" represents the image side),
f1 is the composite focal length of the first lens group, and
β5 is the imaging magnification of the fifth lens group.

Accordingly, it is possible to secure the favorable hand shake correction function and achieve miniaturization and a high zoom power.

In the still another embodiment of the invention, the zoom lens includes, in order from an object side to an image side: the first lens group that has a positive refractive power and remains stationary in the direction of the optical axis; the second lens group that has a negative refractive power and is movable on the optical axis so as to perform the zoom operation; the third lens group that has a positive refractive power and remains stationary in the direction of the optical axis during zooming and focusing; the fourth lens group that has a positive refractive power and is movable on the optical axis so as to correct fluctuation in imaging position and correct change in imaging position caused by change in object distance; and the fifth lens group that has a negative refractive power and remains stationary in the direction of the optical axis. The fifth lens group includes, in order from the object side to the image side, a first lens that has a negative refractive power and remains stationary in the direction of the optical axis, and a second lens that has a positive refractive power and is movable in a direction perpendicular to the direction of the optical axis. By moving the second lens of the fifth lens group in the direction perpendicular to the direction of the optical axis, an image formed on the image plane can be shifted in the direction perpendicular to the direction of the optical axis. The following conditional expressions (1) to (4) are satisfied.

$$1.0 < f3/f4 < 2.0, \quad (1)$$

$$0.25 < |\beta 2w| < 0.4, \quad (2)$$

$$-0.065 < H1'/f1 < -0.045, \text{ and} \quad (3)$$

$$1.1 < \beta 5 < 1.7, \quad (4)$$

where f3 is the composite focal length of the third lens group,
f4 is the composite focal length of the fourth lens group,
β2w is the imaging magnification of the second lens group in the wide-angle end state,
H1' is the space between the vertex of the surface of the first lens group closest to the image side and a principal point of the first lens group close to the image side (the sign "−" represents the object side and the sign "+" represents the image side),
f1 is the composite focal length of the first lens group, and
β5 is the imaging magnification of the fifth lens group.

Accordingly, it is possible to secure the favorable hand shake correction function and achieve miniaturization and a high zoom power.

In the still another embodiment of the invention, the zoom lens is configured to satisfy the following conditional expression (5).

$$0.3 < f5p/ft < 0.7 \quad (5)$$

where f5p is a focal length of the second lens of the fifth lens group, and
ft is a focal length of the whole lens system in a telephoto end state.

Accordingly, it is possible to satisfactorily correct fluctuation in comatic aberration caused when the second lens is shifted in the direction perpendicular to the direction of the optical axis. In addition, it is possible to reduce the size of the driving apparatus by reducing the shift amount of the lens and reduce the size of the lens system by shortening the entire length of the optical system.

In the still another embodiment of the invention, the zoom lens is configured to satisfy the following conditional expression (6).

$$-1.0 < f5n/f5p < -0.5, \quad (6)$$

where f5n is a focal length of the first lens of the fifth lens group.

Accordingly, it is possible to suppress the deterioration of the imaging performance caused by the relative eccentricity of the first lens and the second lens.

In the still another embodiment of the invention, the zoom lens is configured so that the first lens and the second lens of the fifth lens group are made of resin. In addition, the zoom lens is configured to satisfy the conditional expressions (7) and (8).

Accordingly, it is possible to reduce the fluctuation in back focal length at the time of temperature change, and it is also possible to suppress occurrence of chromatic aberration.

In the yet another embodiment of the invention, the imaging apparatus includes: the zoom lens; and the imaging device that converts an optical image, which is formed by the zoom lens, into an electric signal. The zoom lens includes, in order from an object side to an image side: the first lens group that has a positive refractive power and remains stationary in the direction of the optical axis; the second lens group that has a negative refractive power and is movable on the optical axis so as to perform the zoom operation; the third lens group that has a positive refractive power and remains stationary in the direction of the optical axis during zooming and focusing; the fourth lens group that has a positive refractive power and is movable on the optical axis so as to correct fluctuation in imaging position and correct change in imaging position caused by change in object distance; and the fifth lens group that has a negative refractive power and remains stationary in the direction of the optical axis. The fifth lens group includes, in order from the object side to the image side, a first lens that has a negative refractive power and remains stationary in the direction of the optical axis, and a second lens that has a positive refractive power and is movable in a direction perpendicular to the direction of the optical axis. By moving the second lens of the fifth lens group in the direction perpendicular to the direction of the optical axis, an image formed on the image plane can be shifted in the direction perpendicular to the direction of the optical axis. The following conditional expressions (1) to (4) are satisfied.

$$1.0 < f3/f4 < 2.0, \quad (1)$$

$$0.25 < |\beta 2w| < 0.4, \quad (2)$$

$$0.065 < H1'/f1 < -0.045, \text{ and} \quad (3)$$

$$1.1 < \beta 5 < 1.7, \quad (4)$$

where f3 is the composite focal length of the third lens group,
f4 is the composite focal length of the fourth lens group,
β2w is the imaging magnification of the second lens group in the wide-angle end state,
H1' is the space between the vertex of the surface of the first lens group closest to the image side and a principal point of the first lens group close to the image side (the sign "−" represents the object side and the sign "+" represents the image side),
f1 is the composite focal length of the first lens group, and
β5 is the imaging magnification of the fifth lens group.

Accordingly, it is possible to secure the favorable hand shake correction function and achieve miniaturization and a high zoom power.

DESCRIPTION OF THE PREFERRED EMBODIMENTS

Figure 1:
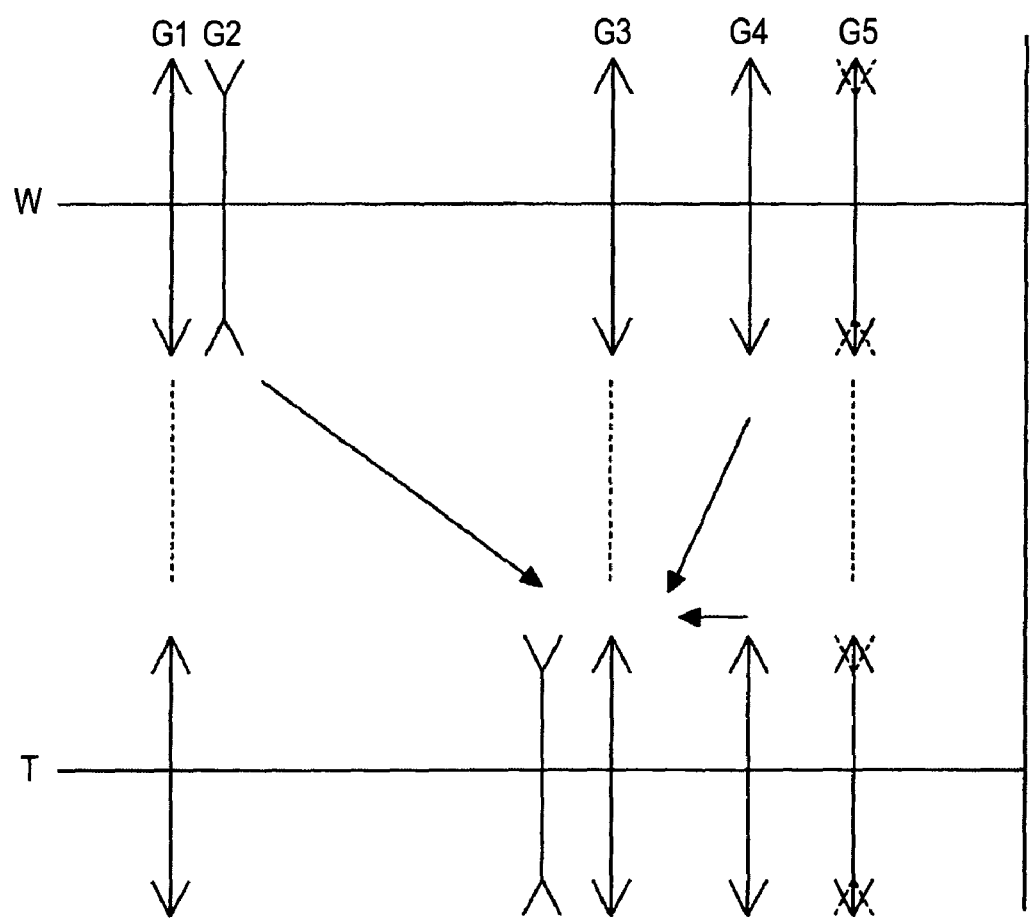
FIG. 1 is a diagram illustrating arrangement of refractive powers of a zoom lens according to embodiments of the invention.

Hereinafter, a zoom lens and an imaging apparatus according to preferred embodiments of the invention will be described.

[Configuration of Zoom Lens]

A zoom lens according to an embodiment of the invention includes, in order from the object side to the image side: a first lens group that has a positive refractive power; a second lens group that has a negative refractive power; a third lens group that has a positive refractive power; a fourth lens group that has a positive refractive power; and a fifth lens group that has a positive refractive power.

Further, the zoom lens according to the embodiment of the invention may include, in order from the object side to the image side: a first lens group that has a positive refractive power; a second lens group that has a negative refractive power; a third lens group that has a positive refractive power; a fourth lens group that has a positive refractive power; and a fifth lens group that has a negative refractive power.

The first lens group remains stationary in the direction of the optical axis, the second lens group is movable on the optical axis so as to perform a zoom operation, and the third lens group remains stationary in the direction of the optical axis during zooming and focusing. The fourth lens group is movable on the optical axis so as to correct fluctuation in imaging position and correct change in imaging position caused by change in object distance; and the fifth lens group remains stationary in the direction of the optical axis.

The fifth lens group includes, in order from the object side to the image side, a first lens that has a negative refractive power and remains stationary in the direction of the optical axis, and a second lens that has a positive refractive power and is movable in a direction perpendicular to the direction of the optical axis.

The zoom lens according to the embodiment of the invention is configured so that, by moving the second lens of the fifth lens group in the direction perpendicular to the direction of the optical axis, an image formed on an image plane can be shifted in the direction perpendicular to the direction of the optical axis.

Further, the zoom lens according to the embodiment of the invention is configured to satisfy the following conditional expressions (1) to (4).

$$1.0 < f3/f4 < 2.0, \quad (1)$$

$$0.25 < |\beta 2w| < 0.4, \quad (2)$$

$$-0.065 < H1'/f1 < -0.045, \text{ and} \quad (3)$$

$$1.1 < \beta 5 < 1.7, \quad (4)$$

where f3 is a composite focal length of the third lens group,
f4 is a composite focal length of the fourth lens group,
$\beta 2w$ is an imaging magnification of the second lens group in a wide-angle end state,
H1' is a space between a vertex of a surface of the first lens group closest to the image side and a principal point of the first lens group close to the image side when the sign "−" represents the object side and the sign "+" represents the image side,
f1 is a composite focal length of the first lens group, and
$\beta 5$ is an imaging magnification of the fifth lens group.

In the zoom lens according to the embodiment of the invention, by satisfying the conditional expressions (1) to (4), it is possible to shorten the entire length of the optical system and correct aberrations in the wide-angle end and middle focus range.

The conditional expression (1) defines the ratio of the refractive power of the third lens group, which has a positive refractive power and remains stationary in the direction of the optical axis, to the refractive power of the fourth lens group which is movable to perform focusing.

When the lower limit of the conditional expression (1) is exceeded, the refractive power of the third lens group becomes too large, or the refractive power of the fourth lens group becomes too small. If the refractive power of the third lens group becomes too large, the spherical aberration is insufficiently corrected on the wide-angle side, and it is difficult to perform the correction because of the fluctuation of spherical aberration during focusing at the middle zoom position. If the refractive power of the fourth lens group becomes too small, the shift amount during focusing increases, and thus fluctuation in aberrations such as image field curvature and comatic aberration increases. Further, since the back focal length unnecessarily increases, it is difficult to shorten the entire length of the optical system.

In contrast, when the upper limit of the conditional expression (1) is exceeded, the refractive power of the third lens group becomes too small, or the refractive power of the fourth lens group becomes too large. If the refractive power of the third lens group becomes too small, the spherical aberration is corrected too much on the wide-angle side. If the refractive power of the fourth lens group becomes too large, the spherical aberration is insufficiently corrected on the wide-angle side.

Accordingly, by making the zoom lens satisfy the conditional expression (1), it is possible to satisfactorily correct aberrations on the wide-angle side and at the middle zoom position, and it is possible to shorten the entire length of the optical system.

The conditional expression (2) defines the range of the magnification (imaging magnification) of the second lens group in the wide-angle end state.

When the upper limit of the conditional expression (2) is exceeded, the magnification of the second lens group at the wide-angle end becomes too large, the focal length of the whole lens system becomes too close to the telephoto end side, and thus it is difficult to obtain the desirable zoom ratio.

In contrast, when the lower limit of the conditional expression (2) is exceeded, this is advantageous in order to achieve high zoom power, but the focal length of the whole lens system becomes too close to the wide-angle end side, and thus the diameter of the lens positioned to be closest to the object side in the first lens group increases. As a result, the whole lens system increases in size.

Accordingly, by making the zoom lens satisfy the conditional expression (2), it is possible to secure the desirable zoom ratio and reduce the size of the whole lens system.

The conditional expression (3) defines the ratio of the space, which exists between the focus of the surface closest to the image side in the first lens group and the image side principal point of the first lens group, to the size of focal length of the first lens group. The expression is a necessity to reduce the space between the principal points of the first lens group and the second lens group.

When the lower limit of the conditional expression (3) is exceeded, the position of the principal point of the first lens group becomes too close to the object side. Hence, it is difficult to reduce the space between the principal points of the first lens group and the second lens group, and thus it is difficult to increase the angle of view.

In contrast, when the upper limit of the conditional expression (3) is exceeded, the space between the first lens group and the second lens group widens, and thus the diameter of the lens, which is disposed to be closest to the object side in the first lens group, increases. As a result, the whole lens system increases in size.

Accordingly, by making the zoom lens satisfy the conditional expression (3), it is possible to increase the angle of view at the focal length in the wide-angle end state, and it is also possible to shorten the entire length of the optical system.

The conditional expression (4) defines the imaging magnification of the fifth lens group.

When the lower limit of the conditional expression (4) is exceeded, the imaging magnification of the fifth lens group becomes too small, and thus it becomes insufficient to shorten the entire length of the optical system.

In contrast, when the upper limit of the conditional expression (4) is exceeded, the imaging magnification of the fifth lens group becomes too large, and thus the entire length of the optical system is shortened, but it becomes difficult to secure a predetermined back focal length. Further, since the distance from the exit pupil to the image plane decreases, the telecentricity is lowered, and thus this is undesirable when being applied to, for example, the video cameras and the like.

Accordingly, by making the zoom lens satisfy the conditional expression (4), the refractive power of the fifth lens group becomes a positive or becomes a negative small refractive power. Thus, it is possible to shorten the entire length of the optical system, and it is also possible to secure favorable optical performance throughout the whole screen.

By making the zoom lens satisfy the conditional expression (4), the refractive power of the fifth lens group becomes a positive or negative small refractive power, and thus it is possible to correspond with a large image plane without increasing the incident angle to the image plane (the imager). Further, since the refractive power of the fifth lens group is small, it is possible to reduce fluctuation in aberrations caused when the image formed on the image plane is shifted in the direction perpendicular to the direction of the optical axis by moving the lens, which is disposed in the fifth lens group, in the direction perpendicular to the direction of the optical axis. Moreover, by providing a lens, which shifts the image in the direction perpendicular to the direction of the optical axis, in the fifth lens group, it is possible to reduce the size of the system of the lens disposed to be closest to the object side in the first lens group.

In the zoom lens according to the embodiment of the invention, it is preferable that the zoom ratio should be 4.5 to 6 times.

In the zoom lens according to the embodiment of the invention, it is preferable to satisfy the following conditional expression (5).

$$0.3 < f5p/ft < 0.7 \qquad (5)$$

where f5p is a focal length of the second lens of the fifth lens group, and ft is a focal length of the whole lens system in a telephoto end state.

The conditional expression (5) defines the ratio of the focal length of the second lens in the fifth lens group to the focal length of the whole lens system in the telephoto end state.

When the lower limit of the conditional expression (5) is exceeded, the off-axis rays pass through the position too far from the optical axis. Hence, it is difficult to satisfactorily correct fluctuation in comatic aberration caused when the second lens having a positive refractive power is shifted in the direction perpendicular to the direction of the optical axis.

In contrast, when the upper limit of the conditional expression (5) is exceeded, the blur correction coefficient is lowered, and thus the entire length of the optical system increases. If the blur correction coefficient is lowered, the shift amount of the lens, which is necessary to correct the image blur by a predetermined amount, increases, and thus the size of the driving apparatus to shift the lens increases. If the entire length of the optical system increases, it is even more difficult to reduce the size of the lens system.

Accordingly, by making the zoom lens satisfy the conditional expression (5), it is possible to satisfactorily correct fluctuation in comatic aberration caused when the second lens is shifted in the direction perpendicular to the direction of the optical axis. In addition, it is possible to reduce the size of the driving apparatus by reducing the shift amount of the lens and reduce the size of the lens system by shortening the entire length of the optical system.

In the zoom lens according to the embodiment of the invention, it is preferable to satisfy the following conditional expression (6).

$$-1.0 < f5n/f5p < -0.5, \qquad (6)$$

where f5n is a focal length of the first lens of the fifth lens group.

When the upper limit of the conditional expression (6) is exceeded, the positive refractive power of the second lens becomes small, and the negative refractive power of the first lens becomes large. Hence, the difference between the refractive power of the first lens and the refractive power of the second lens excessively increases, and thus the imaging performance is more deteriorated by the relative eccentricity of the first lens and the second lens.

In contrast, when the lower limit of the conditional expression (6) is exceeded, the positive refractive power of the second lens becomes large, and the negative refractive power of the first lens becomes small. Hence, the difference between the refractive power of the first lens and the refractive power of the second lens excessively increases, and thus the imaging performance is more deteriorated by the relative eccentricity of the first lens and the second lens.

Accordingly, by making the zoom lens satisfy the conditional expression (6), it is possible to suppress the deterioration of the imaging performance caused by the relative eccentricity of the first lens and the second lens.

In the zoom lens according to the embodiment of the invention, it is preferable that the first lens and the second lens of the fifth lens group should be made of resin, and it is also preferable to satisfy the following conditional expressions (7) and (8).

$$v5a<42, \text{ and} \qquad (7)$$

$$v5b>55, \qquad (8)$$

where v5a is an Abbe number of the first lens of the fifth lens group at the d-line, and v5b is an Abbe number of the second lens of the fifth lens group at the d-line.

Generally, the resin material (the plastic material) has the following characteristics: the change in refractive index is large at the time of change in temperature, and the focal length of the whole lens system is changed when the ambient temperature is changed, thereby fluctuating the back focal length thereof. In the case of the zoom lens, it is possible to correct the position of the image plane by moving the focus lens group in the direction of the optical axis. However, since the heights of the rays passing through the focus lens group are changed by moving the focus lens group, large aberrations such as chromatic aberration and image field curvature are likely to occur.

In that case, in the zoom lens, the refractive power is distributed so as to compensate for fluctuation in back focal length at the time of temperature change, thereby reducing fluctuation in back focal length at the time of temperature change. As a result, it is possible to prevent large aberrations from occurring.

The conditional expression (7) is an expression to appropriately set the Abbe number of the first lens (a negative lens) of the fifth lens group.

The conditional expression (8) is an expression to appropriately set the Abbe number of the second lens (a positive lens) of the fifth lens group.

By making the zoom lens satisfy the conditional expressions (7) and (8), it is possible to effectively correct on-axis chromatic aberration and off-axis chromatic aberration in the whole zoom range.

With such a configuration, it is possible to reduce the fluctuation in back focal length at the time of temperature change, and it is also possible to suppress occurrence of chromatic aberration.

The zoom lens according to one embodiment of the invention is a zoom lens more suitable for the video cameras, digital cameras, and the like. With the zoom lens, an image, which is formed on the solid-state imaging device and is photoelectrically converted, is recorded on a memory or a tape, thereby providing convenience to a user.

[Numerical Examples of Zoom Lens]

Hereinafter, specific examples of the zoom lens according to the embodiments of the invention and numerical examples of the embodiment to which numerical values are applied will be described with reference to the accompanying drawings and tables.

The meanings of reference signs and the like shown in the following tables and description are defined as follows.

"f" represents the focal length, "Fno" represents the F number, "2ω" represents the angle of view, "Si" represents the surface number of i-th surface, and "di" represents the on-axis surface spacing between the i-th surface and the (i+1)th surface. Regarding the radius of curvature, "ASP" represents that the corresponding surface is aspheric, and "∞" represents that the corresponding surface is flat. Regarding the on-axis surface spacing, "variable" represents the variable space, and "Bf" represents the back focal length. "κ" represents the conic constant, and "A", "B", "C", and "D" respectively represent the 4th-order, 6th-order, 8th-order, and 10th-order aspheric surface coefficients.

Further, the refractive index and the Abbe number are values at the d-line ($\lambda=587.6$ nm).

Some lenses used in the numerical example are configured so that the lens surface is formed to be aspheric. With regard to the aspheric shape, it is assumed that "x" is the distance (the sag amount) from the vertex of the lens surface in the direction of the optical axis, "y" is the height (the image height) in the direction perpendicular to the direction of the optical axis, "c" is the paraxial radius of curvature (the inverse of the radius of curvature) at the vertex of the lens, "κ" is the conic constant, and "A", "B", "C", and "D" are respectively the 4th-order, 6th-order, 8th-order, and 10th-order aspheric surface coefficients, the aspheric surface shape is defined as the following Numerical Expression 1.

$$x=cy^2/[1+\{1-(1+\kappa)c^2y^2\}^{1/2}]+Ay^4+By^6+Cy^8+Dy^{10}+\ldots \qquad \text{Numerical Expression 1}$$

FIG. 1 is a diagram illustrating the distribution of the refractive powers of the zoom lenses according to the embodiments of the invention. In the respective embodiments, there are arranged, in order from the object side to the image side, a first lens group G1 that has a positive refractive power, a second lens group G2 that has a negative refractive power, a third lens group G3 that has a positive refractive power, a fourth lens group G4 that has a positive refractive power, and a fifth lens group G5 that has a positive or negative refractive power.

In the respective embodiments, during zooming from the wide-angle end state to the telephoto end state, the air space between the first lens group G1 and the second lens group G2 increases, and the second lens group G2 is moved toward the image side so that the air space between the second lens group G2 and the third lens group G3 is decreased. At this time, the first lens group G1, the third lens group G3, and the fifth lens group G5 remain stationary in the direction of the optical axis, and the fourth lens group G4 is moved in the direction of the optical axis so as to correct fluctuation in image plane position caused by the movement of the second lens group G2 and is moved toward the object side during focusing at the near distance.

First Embodiment

Figure 2:
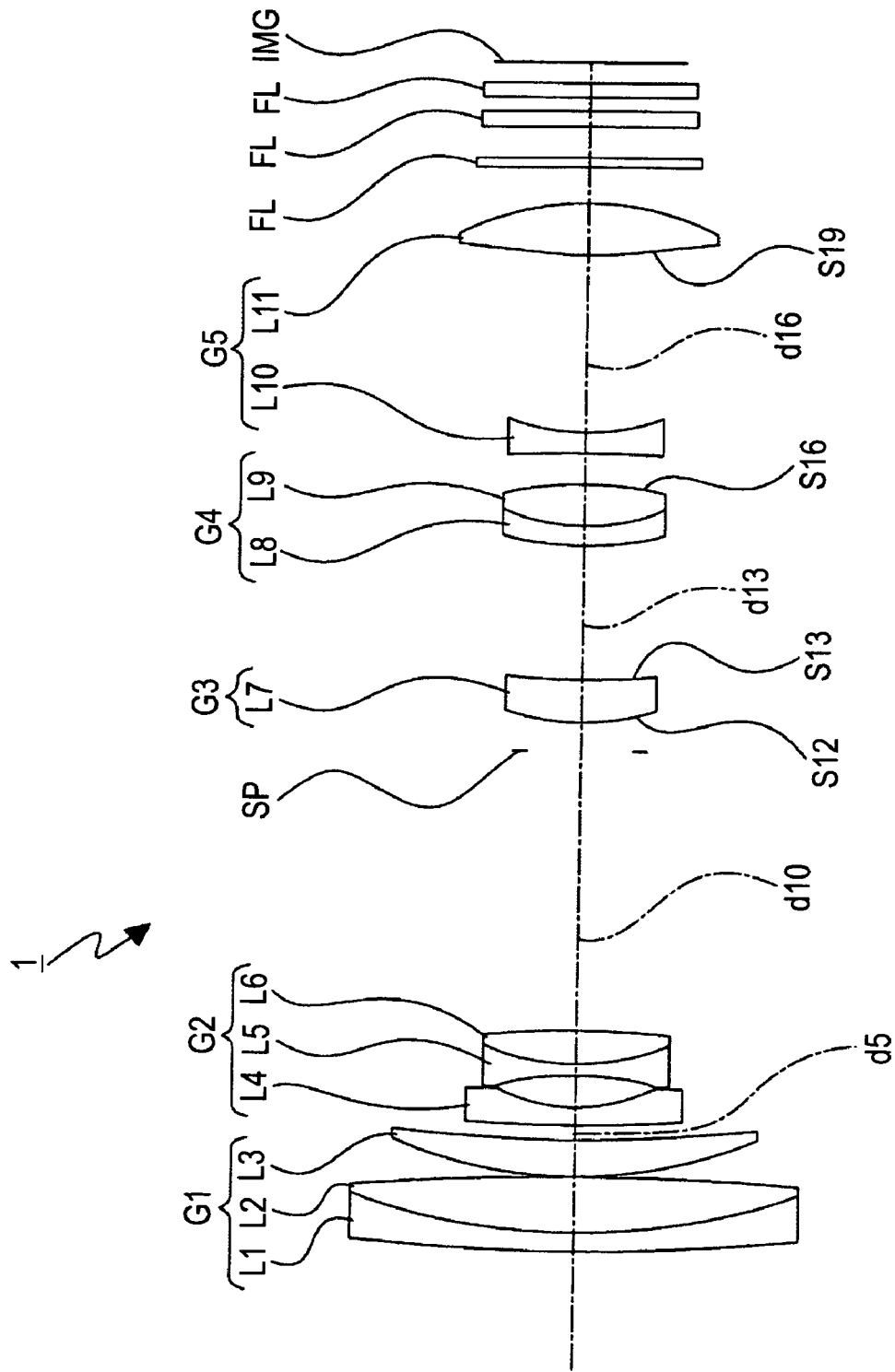
FIG. 2 is a diagram illustrating a lens configuration of a zoom lens according to a first embodiment of the invention.

FIG. 2 shows the lens configuration of the zoom lens 1 according to the first embodiment of the invention. The zoom lens 1 has eleven lenses.

The zoom lens 1 includes, in order from the object side to the image side: the first lens group G1 that has a positive refractive power; the second lens group G2 that has a negative refractive power; the third lens group G3 that has a positive refractive power; the fourth lens group G4 that has a positive refractive power; and the fifth lens group G5 that has a small positive refractive power.

In the zoom lens 1, the zoom ratio is set to be five times.

The first lens group G1 includes, in order from the object side to the image side: a cemented lens formed of a negative lens L1 that has a meniscus shape and has a surface convex toward the object side and a positive lens L2 that has a biconvex shape and is disposed to be close to the image side of the negative lens L1; and a positive lens L3 that has a meniscus shape and has a surface convex toward the object side. The negative lens L1, the positive lens L2, and the positive lens L3 are made of glass.

The second lens group G2 includes, in order from the object side to the image side, a cemented lens formed of a negative lens L4 that has a meniscus shape and has a surface concave toward the image side, a negative lens L5 that has a biconcave shape, and a positive lens L6 that has a biconvex shape and is disposed to be close to the image side of the corresponding negative lens L5. The negative lens L4, the negative lens L5, and the positive lens L6 are made of glass.

The third lens group G3 includes a positive lens L7 that has a biconvex shape. The positive lens L7 is made of glass.

An aperture diaphragm SP is disposed to be close to the object side of the third lens group G3.

The fourth lens group G4 includes a cemented lens formed of a negative lens L8 that has a meniscus shape and has a surface convex toward the object side and a positive lens L9 that has a biconvex shape and is disposed to be close to the image side of the corresponding negative lens L8. The negative lens L8 and the positive lens L9 are made of glass.

The fifth lens group G5 includes, in order from the object side to the image side: a negative lens L10 that is a first lens having a biconcave shape; and a positive lens L11 that is a second lens having a biconvex shape. The negative lens L10 and the positive lens L11 are made of resin (plastic). In order to correct image blur, the positive lens L11 of the fifth lens group functions as an image stabilization lens that is moved in the direction perpendicular to the direction of the optical axis so as to shift the image formed on the image plane in the direction perpendicular to the direction of the optical axis.

The filters FL, FL, and FL are arranged between the fifth lens group G5 and the image plane IMG. As the filter FL, for example, a low-pass filter, which prevents occurrence of the moiré pattern, and an infrared cut-off filter, which is disposed in accordance with spectrum sensitivity characteristics of the imaging device, are used.

Table 1 shows the lens data of Numerical Example 1 of the zoom lens 1, to which specific numerical values are applied, according to the first embodiment.

TABLE 1

| SURFACE NUMBER | RADIUS OF CURVATURE | SURFACE SPACING | REFRACTIVE INDEX | ABBE NUMBER |
|---|---|---|---|---|
| 1 | 13.95588 | 0.158752 | 2.00272 | 19.3 |
| 2 | 4.82149 | 0.360253 | 1.69680 | 55.5 |
| 3 | −25.21310 | 0.023809 | | |
| 4 | 3.11428 | 0.275458 | 1.88300 | 40.8 |
| 5 | 9.05189 | variable | | |
| 6 | 76.85432 | 0.095235 | 1.88300 | 40.8 |
| 7 | 1.45584 | 0.207823 | | |
| 8 | −2.21147 | 0.095235 | 1.88300 | 40.8 |
| 9 | 1.53847 | 0.219328 | 1.94595 | 18.0 |
| 10 | 10.97435 | variable | | |
| 11 (APERTURE DIAPHRAGM) | ∞ | 0.238088 | | |
| 12 | 1.64942(ASP) | 0.285705 | 1.52470 | 56.2 |
| 13 | −27.59053(ASP) | variable | | |
| 14 | 2.17075 | 0.144926 | 1.92286 | 20.9 |
| 15 | 1.28400 | 0.283112 | 1.76802 | 49.2 |
| 16 | −3.53473(ASP) | variable | | |
| 17 | −7.57461 | 0.158725 | 1.58228 | 29.5 |
| 18 | 1.39306 | 1.288220 | | |
| 19 | 3.39396(ASP) | 0.396813 | 1.52470 | 56.2 |
| 20 | −1.86059 | 0.238088 | | |
| 21 | ∞ | 0.068252 | 1.51680 | 64.2 |
| 22 | ∞ | 0.238088 | | |
| 23 | ∞ | 0.120631 | 1.55232 | 63.4 |
| 24 | ∞ | 0.111108 | | |
| 25 | ∞ | 0.079363 | 1.51680 | 64.2 |
| 26 | ∞ | (Bf) | | |

In the zoom lens 1, both surfaces (the twelfth surface and the thirteenth surface) of the positive lens L7 of the third lens group G3, the image side surface (the sixteenth surface) of the positive lens L9 of the fourth lens group G4, and the object side surface (the nineteenth surface) of the positive lens L11 of the fifth lens group G5 are formed to be aspheric. Table 2 shows the 4th-order, 6th-order, 8th-order, and 10th-order aspheric coefficients A, B, C, and D of the aspheric surfaces in Numerical Example 1 together with the conic constant κ.

In Table 2 and the respective tables showing the aspheric surface coefficients to be described later, the reference sign "E−i" represents an exponential expression having a base of 10, that is, "$10^{-i}$". For example, "0.12345E−05" represents "$0.12345 \times 10^{-5}$".

TABLE 2

| | κ | A | B | C | D |
|---|---|---|---|---|---|
| TWELFTH SURFACE | 0.000000 | 0.736326E−01 | 0.878831E−01 | 0.196991E+00 | −0.120283E−01 |
| THIRTEENTH SURFACE | 0.000000 | 0.125405E+00 | 0.120637E+00 | 0.196994E+00 | 0.781919E−01 |
| SIXTEENTH SURFACE | 0.000000 | 0.421951E−01 | 0.162348E−02 | −0.194415E−01 | 0.781919E−01 |
| NINETEENTH SURFACE | 0.000000 | 0.763866E−01 | 0.540063E−02 | 0.179827E−01 | −0.258151E−01 |

In the zoom lens 1, during zooming between the wide-angle end state and the telephoto end state, the surface spacing d5 between the first lens group G1 and the second lens group G2, the surface spacing d10 between the second lens group G2 and the third lens group G3 (the aperture diaphragm SP), the surface spacing d13 between the third lens group G3 and the fourth lens group G4, and the surface spacing d16 between the fourth lens group G4 and the fifth lens group G5 are varied. Table 3 shows the variable spaces of the surface spacings in the wide-angle end state (f=1.000), the middle focal length state (f=2.213) and the telephoto end state (f=5.000), together with the F number Fno and the angle of view 2ω, in Numerical Example 1.

TABLE 3

|  | WIDE-ANGLE END | MIDDLE FOCUS | TELEPHOTO END |
|---|---|---|---|
| f | 1.000 | 2.213 | 5.000 |
| Fno | 3.501 | 3.660 | 4.019 |
| 2ω | 67.228 | 31.303 | 13.745 |
| d5 | 0.143 | 1.219 | 1.985 |
| d10 | 2.065 | 0.989 | 0.222 |
| d13 | 0.982 | 0.657 | 0.317 |
| d16 | 0.238 | 0.564 | 0.903 |
| Bf | 0.127 | 0.127 | 0.127 |

Figure 3:
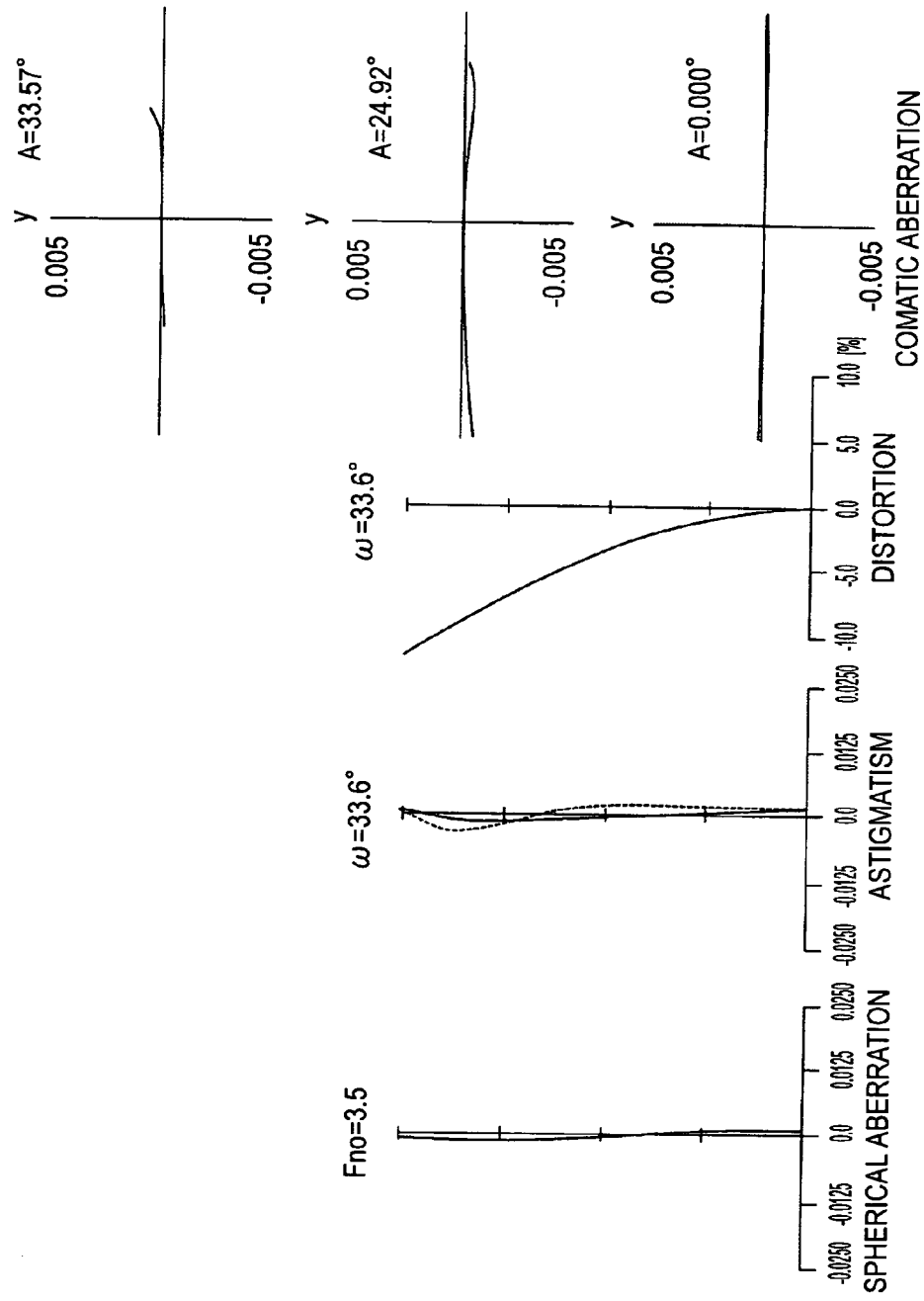
FIG. 3 is a diagram illustrating aberrations in a numerical example of the first embodiment to which specific numerical values are applied, together with FIGS. 4 and 5, the diagram illustrating spherical aberration, astigmatism, distortion, and comatic aberration in the wide-angle end state.
Figure 4:
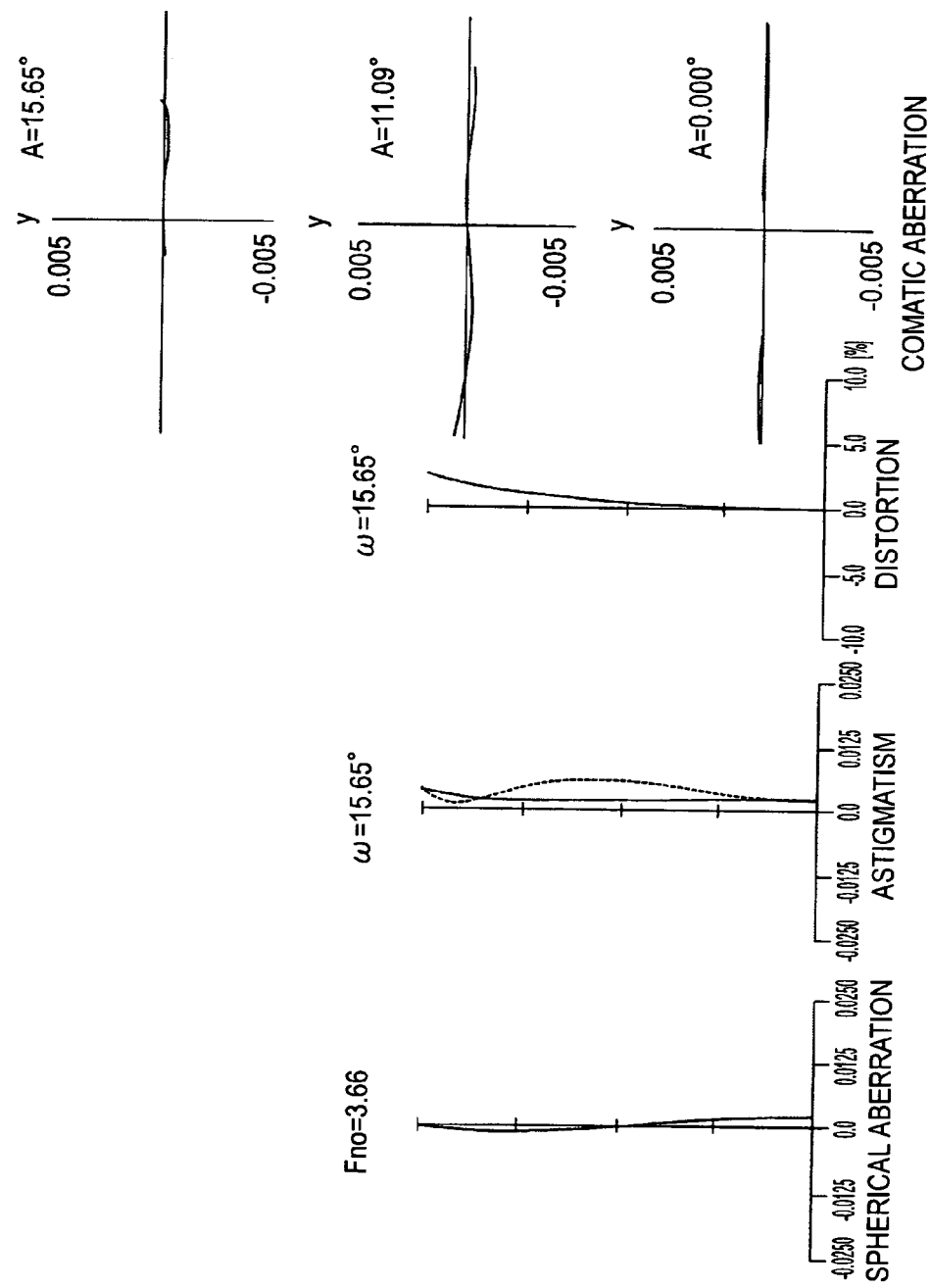
FIG. 4 is a diagram illustrating spherical aberration, astigmatism, distortion, and comatic aberration in the middle focal length state.
Figure 5:
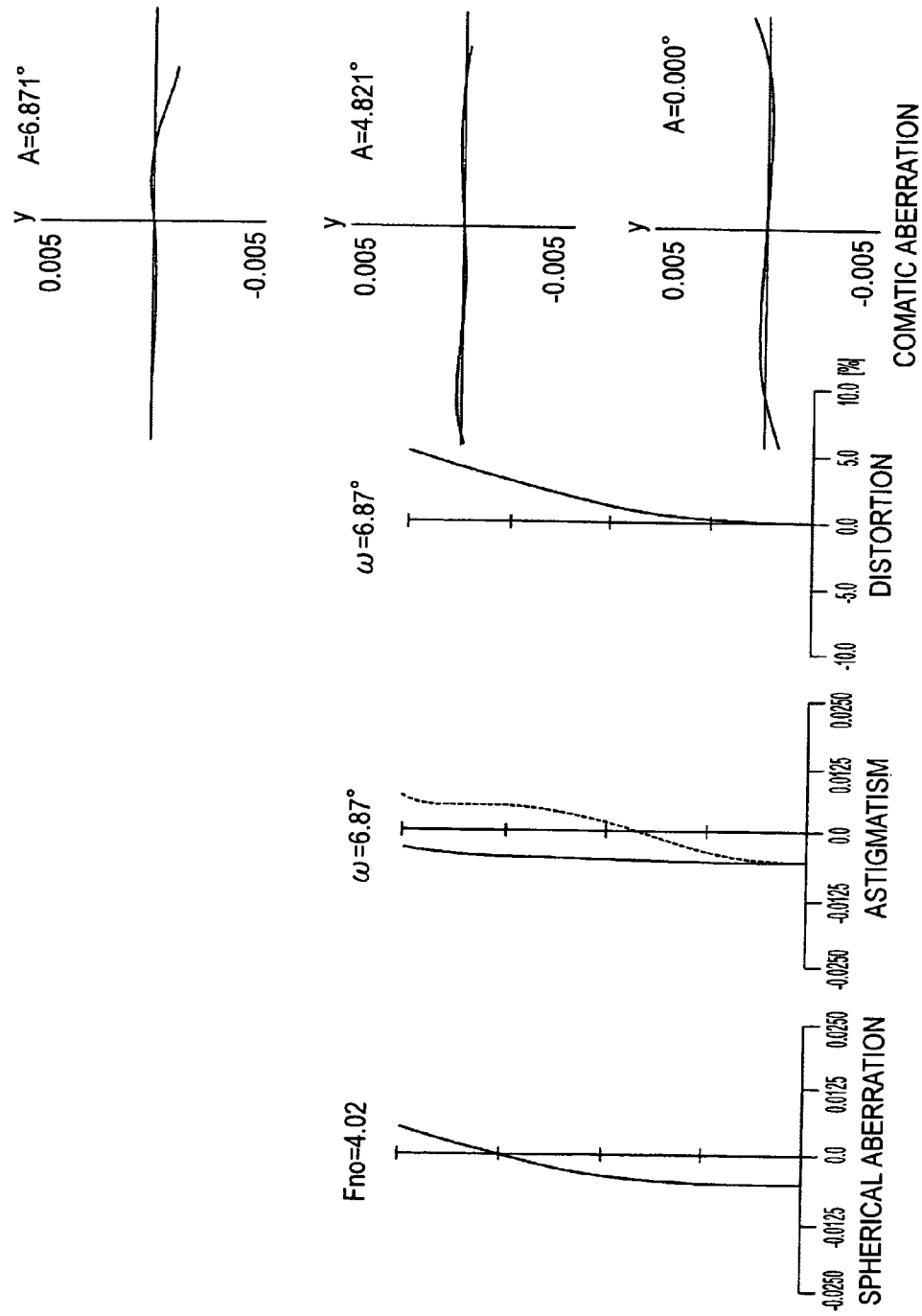
FIG. 5 is a diagram illustrating spherical aberration, astigmatism, distortion, and comatic aberration in the telephoto end state.

FIGS. 3 to 5 show various aberration diagrams in the infinite focus condition of Numerical Example 1. FIG. 3 shows various aberration diagrams in the wide-angle end state (f=1.000). FIG. 4 shows various aberration diagrams in the middle focal length state (f=2.213). FIG. 5 shows various aberration diagrams in the telephoto end state (f=5.000).

In each astigmatism diagram of FIGS. 3 to 5, the solid line represents a value on the sagittal image plane, and the dashed line shows a value on the meridional image plane. In each comatic aberration diagram, A represents the angle of view, and y represents the image height.

Figure 6:
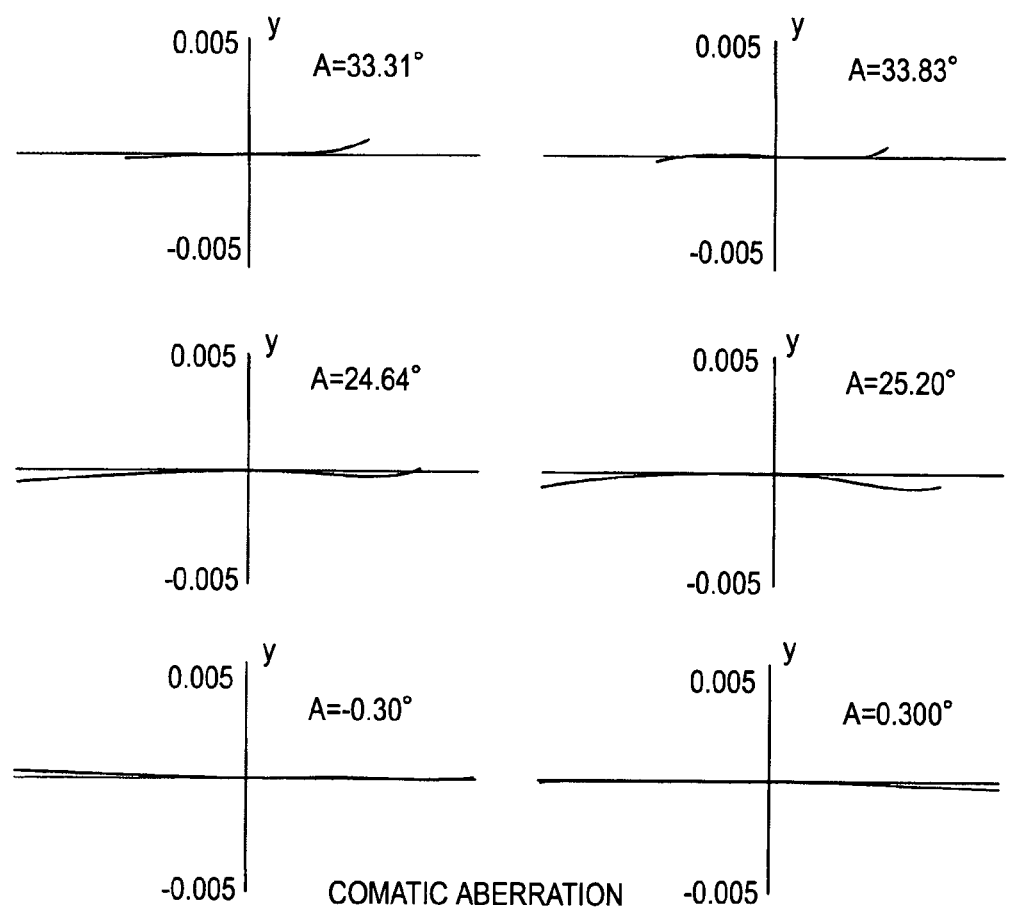
FIG. 6 is a diagram illustrating aberration in the lens shift condition of 0.3 degrees in the numerical example of the first embodiment to which specific numerical values are applied, together with FIGS. 7 and 8, the diagram illustrating comatic aberration in the wide-angle end state.
Figure 7:
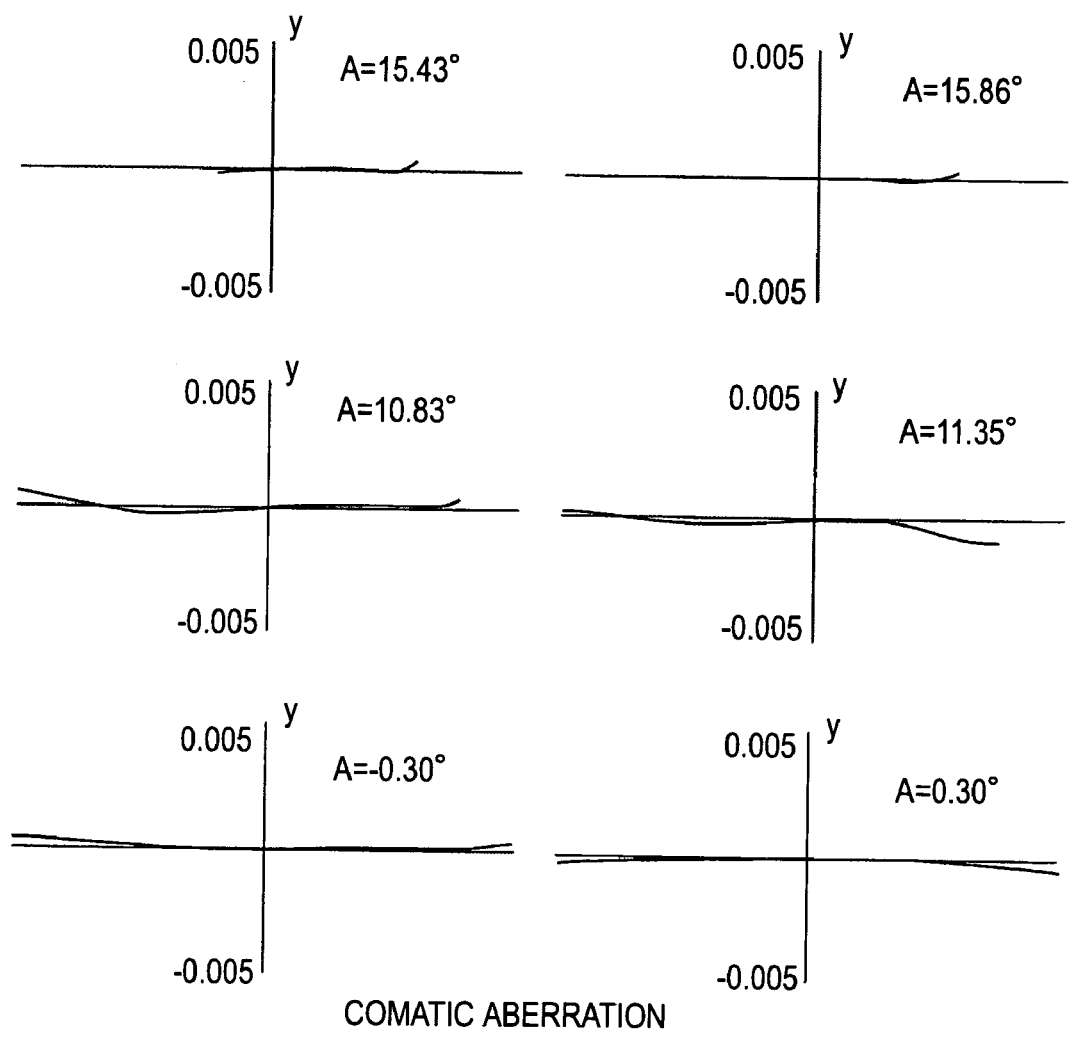
FIG. 7 is a diagram illustrating spherical aberration, astigmatism, distortion, and comatic aberration in the middle focal length state.
Figure 8:
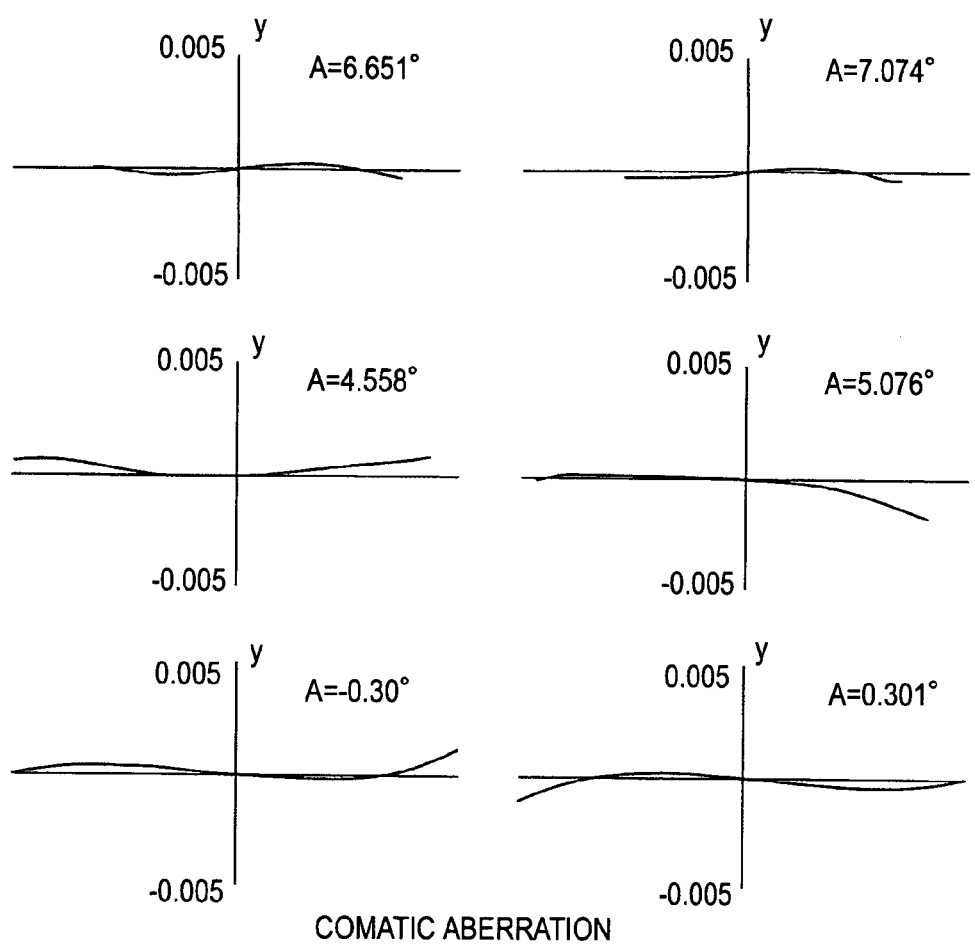
FIG. 8 is a diagram illustrating spherical aberration, astigmatism, distortion, and comatic aberration in the telephoto end state.

FIGS. 6 to 8 show comatic aberration diagrams in the lens shift condition (the condition in which the positive lens L11 of the fifth lens group G5 is moved in the direction perpendicular to the direction of the optical axis) of 0.3 degrees relative to the infinite focus condition of Numerical Example 1. FIG. 6 shows comatic aberration diagrams in the wide-angle end state (f=1.000). FIG. 7 shows comatic aberration diagrams in the middle focal length state (f=2.213). FIG. 8 shows comatic aberration diagrams in the telephoto end state (f=5.000).

As can be seen from the aberration diagrams, in Numerical Example 1, it is possible to obtain an excellent imaging performance by satisfactorily correcting various aberrations.

Second Embodiment

Figure 9:
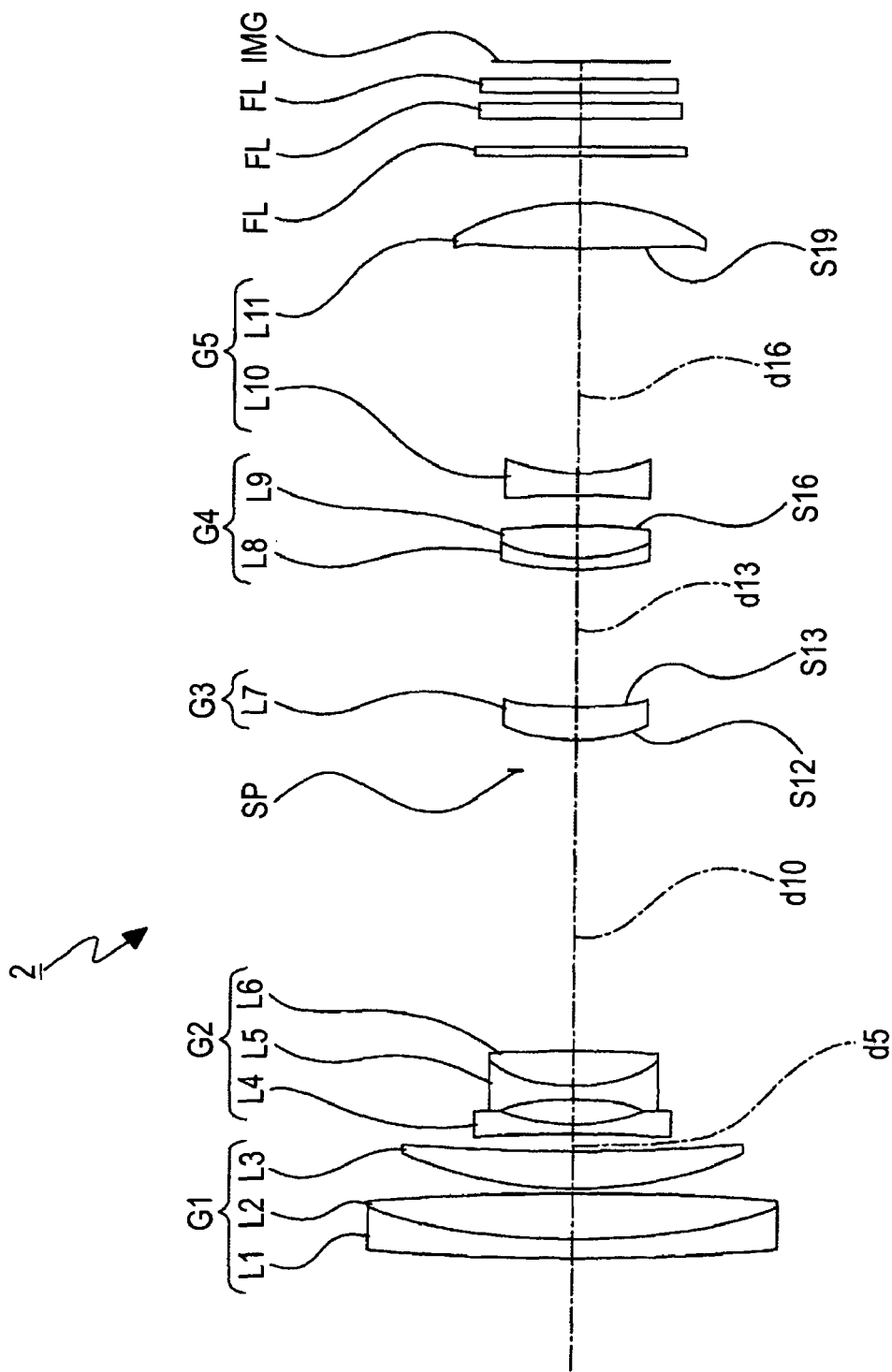
FIG. 9 is a diagram illustrating a lens configuration of a zoom lens according to a second embodiment of the invention.

FIG. 9 shows the lens configuration of the zoom lens 2 according to the second embodiment of the invention. The zoom lens 2 has eleven lenses.

The zoom lens 2 includes, in order from the object side to the image side: the first lens group G1 that has a positive refractive power; the second lens group G2 that has a negative refractive power; the third lens group G3 that has a positive refractive power; the fourth lens group G4 that has a positive refractive power; and the fifth lens group G5 that has a small positive refractive power.

In the zoom lens 2, the zoom ratio is set to be six times. The first lens group G1 includes, from the object side to the image side: a cemented lens formed of a negative lens L1 that has a meniscus shape and has a surface convex toward the object side and a positive lens L2 that has a biconvex shape and is disposed to be close to the image side of the negative lens L1; and a positive lens L3 that has a meniscus shape and has a surface convex toward the object side. The negative lens L1, the positive lens L2, and the positive lens L3 are made of glass.

The second lens group G2 includes, in order from the object side to the image side, a cemented lens formed of a negative lens L4 that has a biconcave shape, a negative lens L5 that has a biconcave shape, and a positive lens L6 that has a biconvex shape and is disposed to be close to the image side of the corresponding negative lens L5. The negative lens L4, the negative lens L5, and the positive lens L6 are made of glass.

The third lens group G3 includes a positive lens L7 that has a meniscus shape and has a surface convex toward the object side. The positive lens L7 is made of glass.

An aperture diaphragm SP is disposed to be close to the object side of the third lens group G3.

The fourth lens group G4 includes a cemented lens formed of a negative lens L8 that has a meniscus shape and has a surface convex toward the object side and a positive lens L9 that has a biconvex shape and is disposed to be close to the image side of the corresponding negative lens L8. The negative lens L8 and the positive lens L9 are made of glass.

The fifth lens group G5 includes, in order from the object side to the image side: a negative lens L10 that is a first lens having a biconcave shape; and a positive lens L11 that is a second lens having a biconvex shape. The negative lens L10 and the positive lens L11 are made of resin (plastic). In order to correct image blur, the positive lens L11 of the fifth lens group functions as an image stabilization lens that is moved in the direction perpendicular to the direction of the optical axis so as to shift the image formed on the image plane in the direction perpendicular to the direction of the optical axis.

The filters FL, FL, and FL are arranged between the fifth lens group G5 and the image plane IMG. As the filter FL, for example, a low-pass filter which prevents occurrence of the moiré pattern, an infrared cut-off filter which is disposed in accordance with spectrum sensitivity characteristics of the imaging device, and the like are used.

Table 4 shows the lens data of Numerical Example 2 of the zoom lens 2, to which specific numerical values are applied, according to the second embodiment.

TABLE 4

| SURFACE NUMBER | RADIUS OF CURVATURE | SURFACE SPACING | REFRACTIVE INDEX | ABBE NUMBER |
|---|---|---|---|---|
| 1 | 17.83289 | 0.158792 | 2.00272 | 19.3 |
| 2 | 4.75605 | 0.375584 | 1.21299 | 53.9 |
| 3 | −19.53777 | 0.023819 | | |
| 4 | 3.30408 | 0.279051 | 1.91082 | 35.2 |
| 5 | 11.04271 | variable | | |
| 6 | −144.14316 | 0.095275 | 1.91082 | 35.2 |
| 7 | 1.48681 | 0.208407 | | |
| 8 | −1.91562 | 0.095275 | 1.91082 | 35.2 |
| 9 | 1.33684 | 0.267524 | 1.94595 | 18.0 |
| 10 | −51.12488 | variable | | |
| 11 (APERTURE DIAPHRAGM) | ∞ | 0.238188 | | |
| 12 | 1.41450(ASP) | 0.285826 | 1.52470 | 56.2 |
| 13 | 4.93041(ASP) | variable | | |
| 14 | 2.18105 | 0.095275 | 1.92286 | 20.9 |
| 15 | 1.33560 | 0.275111 | 1.76802 | 49.2 |
| 16 | −3.74957(ASP) | variable | | |
| 17 | −9.12735 | 0.158792 | 1.58228 | 29.5 |
| 18 | 1.63459 | 1.767833 | | |
| 19 | 4.97071(ASP) | 0.396980 | 1.52470 | 56.2 |
| 20 | −1.66972 | 0.352486 | | |
| 21 | ∞ | 0.068281 | 1.51680 | 64.2 |
| 22 | ∞ | 0.238188 | | |
| 23 | ∞ | 0.120682 | 1.55232 | 63.4 |
| 24 | ∞ | 0.111155 | | |
| 25 | ∞ | 0.079396 | 1.51680 | 64.2 |
| 26 | ∞ | (Bf) | | |

In the zoom lens 2, both surfaces (the twelfth surface and the thirteenth surface) of the positive lens L7 of the third lens group G3, the image side surface (the sixteenth surface) of the positive lens L9 of the fourth lens group G4, and the object side surface (the nineteenth surface) of the positive lens L11 of the fifth lens group G5 are formed to be aspheric. Table 5 shows the 4th-order, 6th-order, 8th-order, and 10th-order aspheric coefficients A, B, C, and D of the aspheric surfaces in Numerical Example 2 together with the conic constant κ.

TABLE 5

| | κ | A | B | C | D |
|---|---|---|---|---|---|
| TWELFTH SURFACE | 0.000000 | 0.154922E+00 | 0.305137E+00 | −0.499187E−01 | 0.778948E−01 |
| THIRTEENTH SURFACE | 0.000000 | 0.241916E+00 | 0.378145E+00 | 0.196411E+00 | 0.778948E−01 |
| SIXTEENTH SURFACE | 0.000000 | 0.333417E−01 | −0.202441E−01 | 0.777572E−02 | 0.778948E−01 |
| NINETEENTH SURFACE | 0.000000 | 0.996806E−01 | 0.175048E−01 | −0.154622E−01 | 0.965849E−03 |

In the zoom lens 2, during zooming between the wide-angle end state and the telephoto end state, the surface spacing d5 between the first lens group G1 and the second lens group G2, the surface spacing d10 between the second lens group G2 and the third lens group G3 (the aperture diaphragm SP), the surface spacing d13 between the third lens group G3 and the fourth lens group G4, and the surface spacing d16 between the fourth lens group G4 and the fifth lens group G5 are varied. Table 6 shows the variable spaces of the surface spacings in the wide-angle end state (f=1.000), the middle focal length state (f=2.450) and the telephoto end state (f=6.003), together with the F number Fno and the angle of view 2ω, in Numerical Example 2.

TABLE 6

| | WIDE-ANGLE END | MIDDLE FOCUS | TELEPHOTO END |
|---|---|---|---|
| f | 1.000 | 2.450 | 6.003 |
| Fno | 3.499 | 3.747 | 4.167 |
| 2ω | 67.228 | 27.775 | 11.254 |
| d5 | 0.143 | 1.341 | 2.162 |
| d10 | 2.242 | 1.044 | 0.222 |
| d13 | 1.081 | 0.700 | 0.363 |
| d16 | 0.243 | 0.623 | 0.960 |
| Bf | 0.127 | 0.127 | 0.127 |

Figure 10:
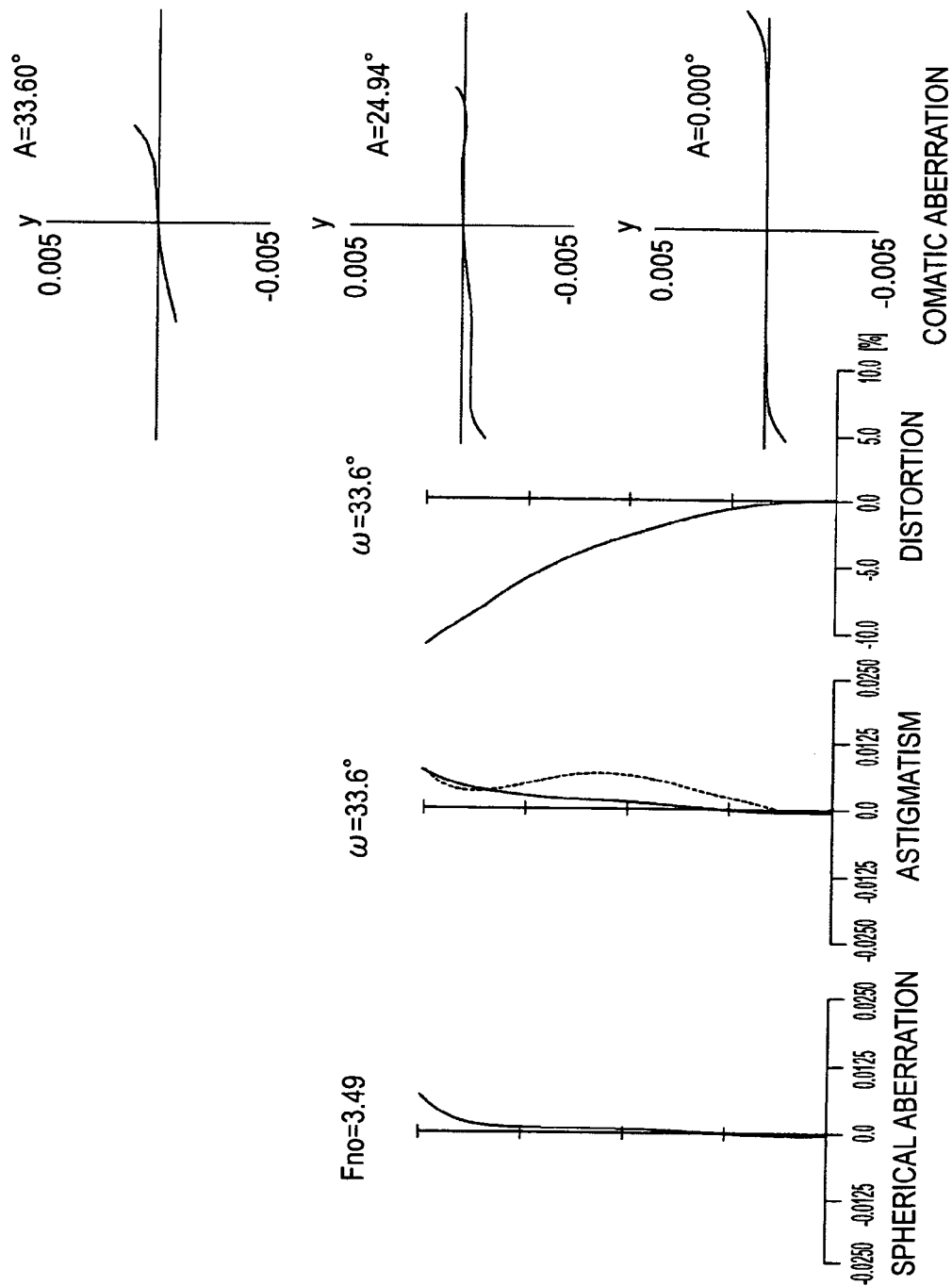
FIG. 10 is a diagram illustrating aberrations in a numerical example of the second embodiment to which specific numerical values are applied, together with FIGS. 11 and 12, the diagram illustrating spherical aberration, astigmatism, distortion, and comatic aberration in the wide-angle end state.
Figure 11:
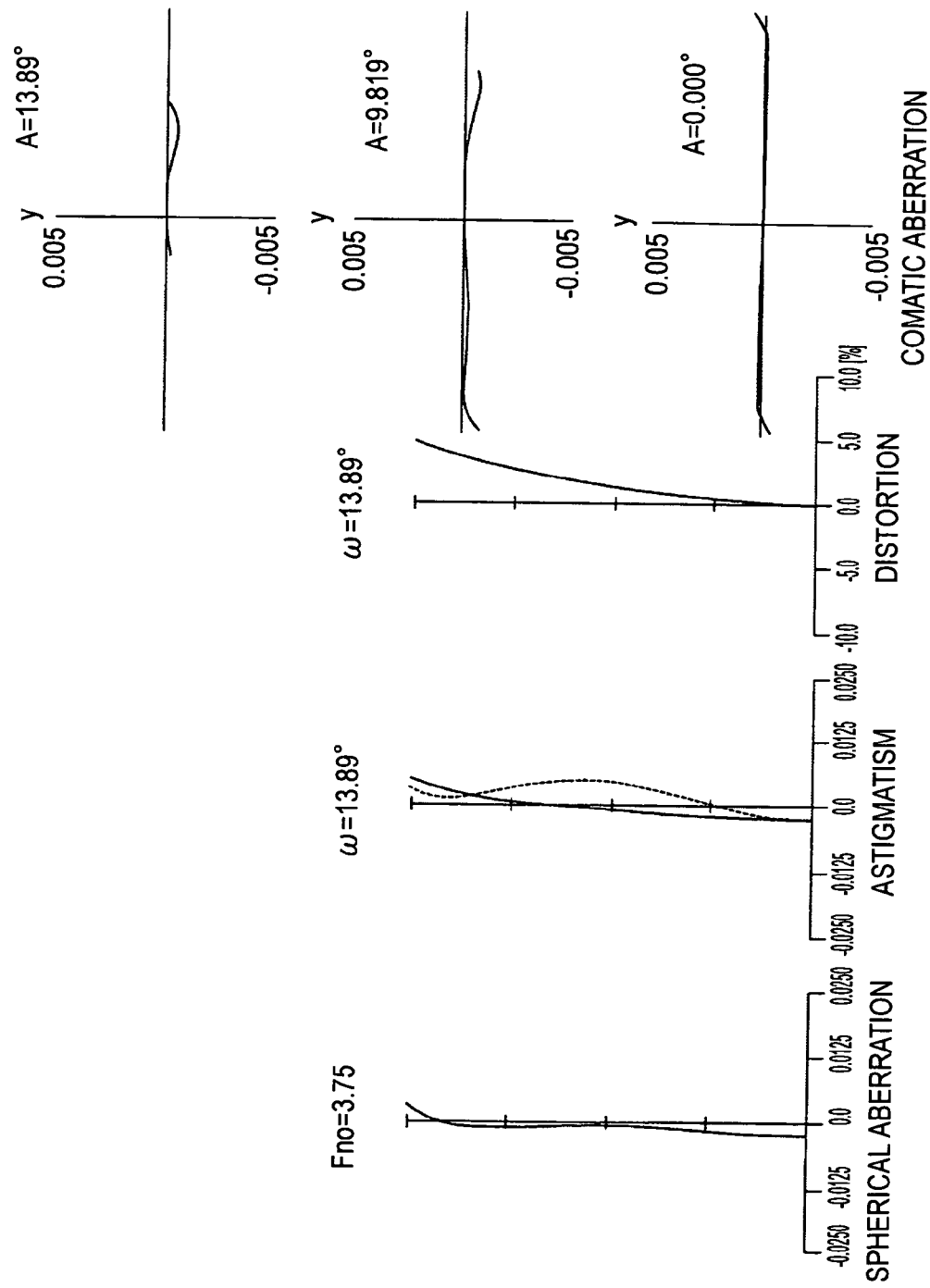
FIG. 11 is a diagram illustrating spherical aberration, astigmatism, distortion, and comatic aberration in the middle focal length state.
Figure 12:
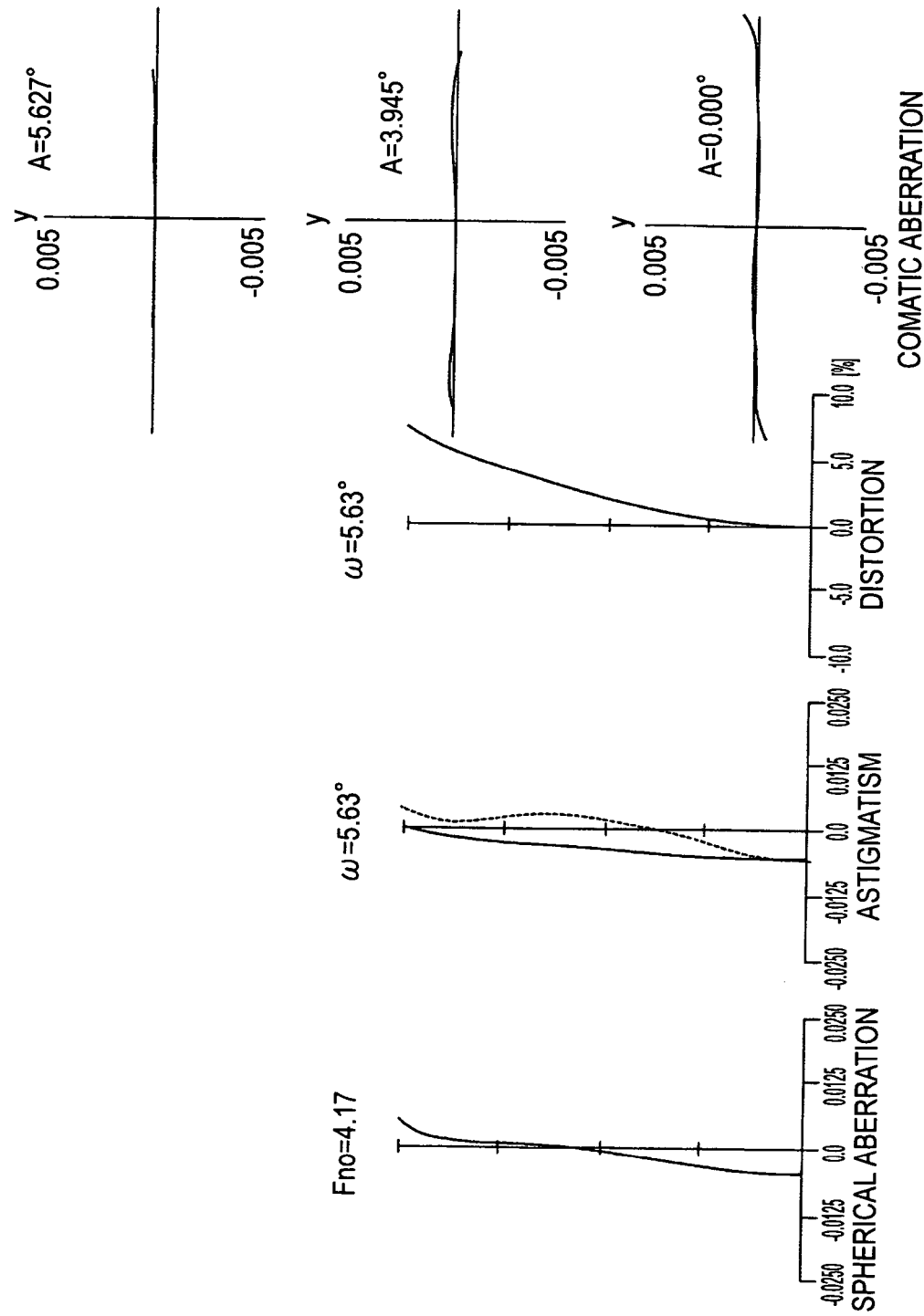
FIG. 12 is a diagram illustrating spherical aberration, astigmatism, distortion, and comatic aberration in the telephoto end state.

FIGS. 10 to 12 show various aberration diagrams in the infinite focus condition of Numerical Example 2. FIG. 10 shows various aberration diagrams in the wide-angle end state (f=1.000). FIG. 11 shows various aberration diagrams in the middle focal length state (f=2.450). FIG. 12 shows various aberration diagrams in the telephoto end state (f=6.003).

In each astigmatism diagram of FIGS. 10 to 12, the solid line represents a value on the sagittal image plane, and the dashed line shows a value on the meridional image plane. In each comatic aberration diagram, A represents the angle of view, and y represents the image height.

Figure 13:
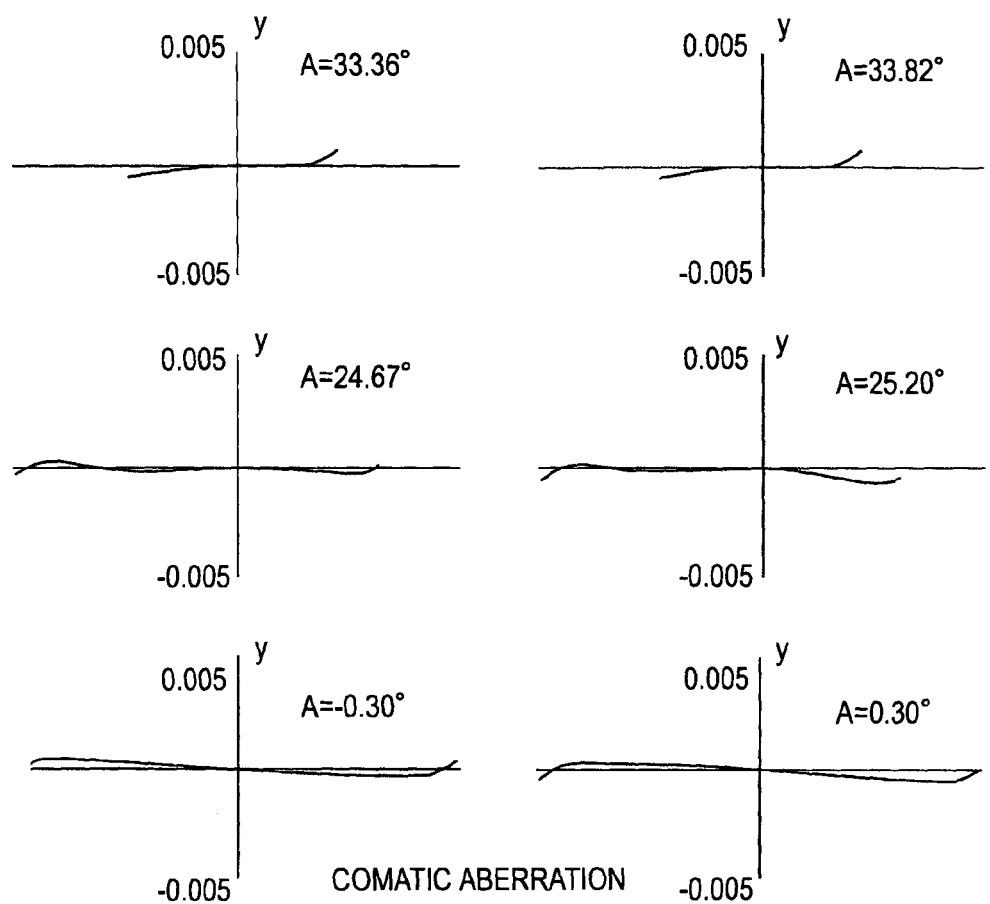
FIG. 13 is a diagram illustrating aberration in the lens shift condition of 0.3 degrees in the numerical example of the second embodiment to which specific numerical values are applied, together with FIGS. 14 and 15, the diagram illustrating comatic aberration in the wide-angle end state.
Figure 14:
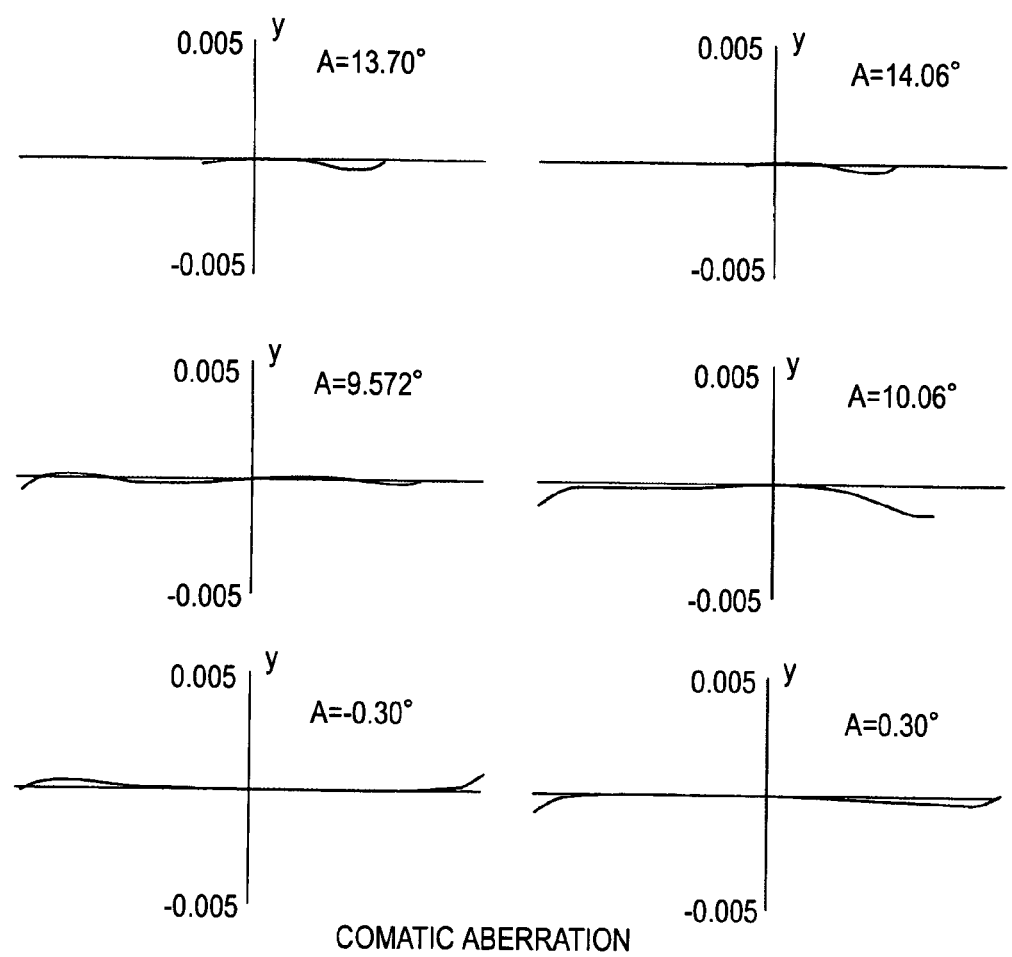
FIG. 14 is a diagram illustrating spherical aberration, astigmatism, distortion, and comatic aberration in the middle focal length state.
Figure 15:
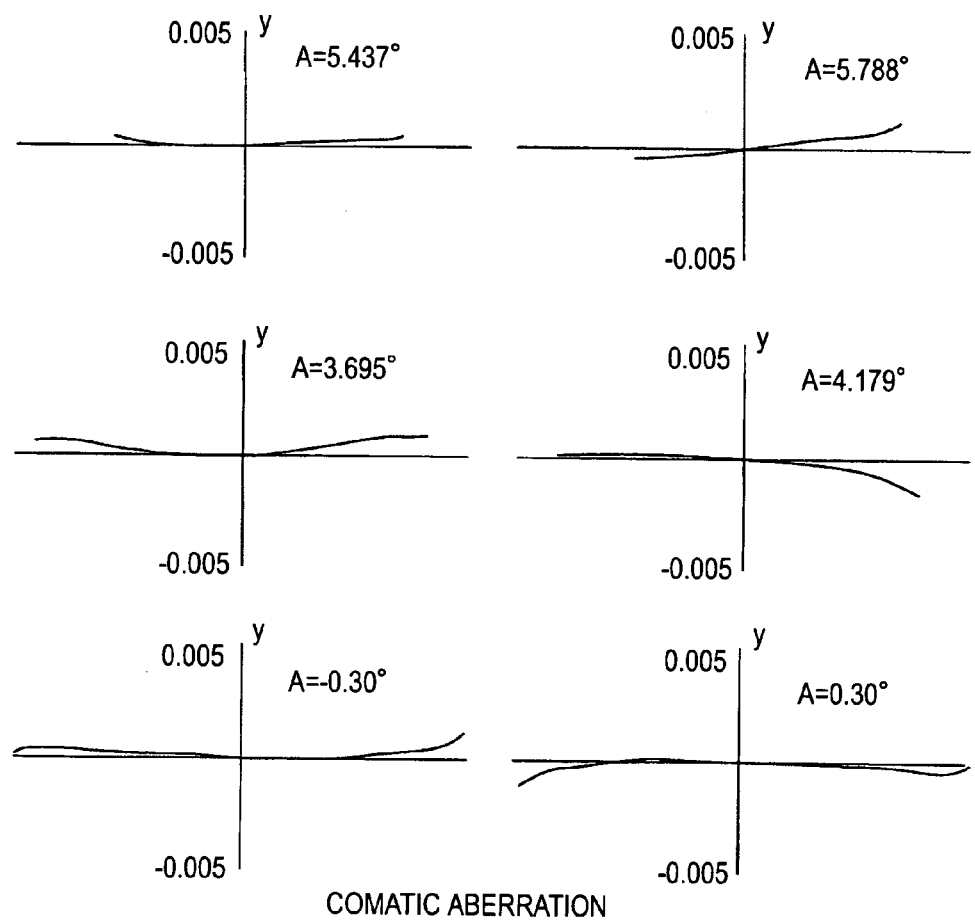
FIG. 15 is a diagram illustrating spherical aberration, astigmatism, distortion, and comatic aberration in the telephoto end state.

FIGS. 13 to 15 show comatic aberration diagrams in the lens shift condition (the condition in which the positive lens L11 of the fifth lens group G5 is moved in the direction perpendicular to the direction of the optical axis) of 0.3 degrees relative to the infinite focus condition of Numerical Example 2. FIG. 13 shows comatic aberration diagrams in the wide-angle end state (f=1.000). FIG. 14 shows comatic aberration diagrams in the middle focal length state (f=2.450). FIG. 15 shows comatic aberration diagrams in the telephoto end state (f=6.003).

As can be seen from the aberration diagrams, in Numerical Example 2, it is possible to obtain an excellent imaging performance by satisfactorily correcting various aberrations.

Third Embodiment

Figure 16:
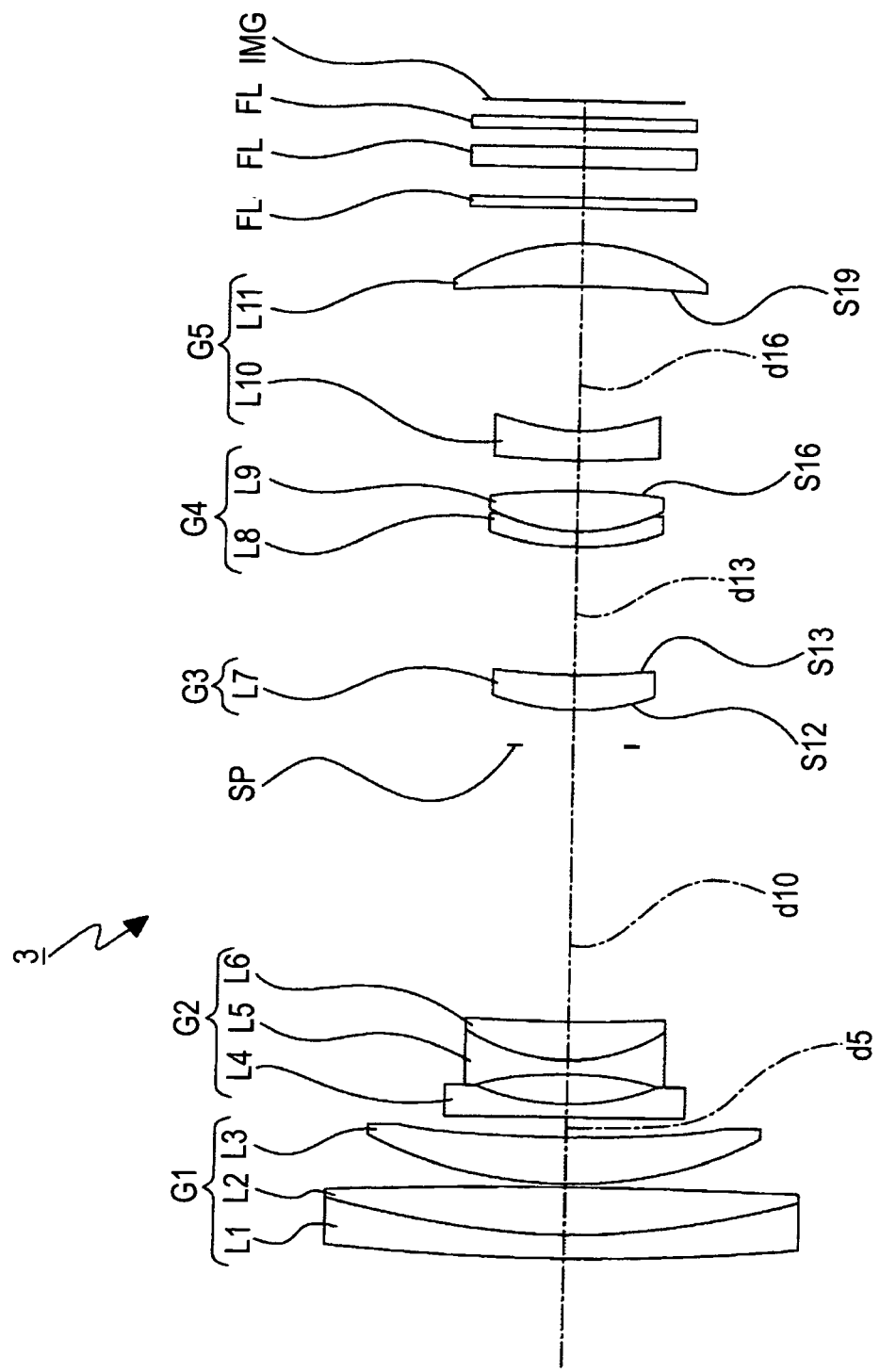
FIG. 16 is a diagram illustrating a lens configuration of a zoom lens according to a third embodiment of the invention.

FIG. 16 shows the lens configuration of the zoom lens 3 according to the third embodiment of the invention. The zoom lens 3 has eleven lenses.

The zoom lens 3 includes, in order from the object side to the image side: the first lens group G1 that has a positive refractive power; the second lens group G2 that has a negative refractive power; the third lens group G3 that has a positive refractive power; the fourth lens group G4 that has a positive refractive power; and the fifth lens group G5 that has a small positive refractive power.

In the zoom lens 3, the zoom ratio is set to be 4.5 times.

The first lens group G1 includes, from the object side to the image side: a cemented lens formed of a negative lens L1 that has a meniscus shape and has a surface convex toward the object side and a positive lens L2 that has a biconvex shape and is disposed to be close to the image side of the negative lens L1; and a positive lens L3 that has a meniscus shape and has a surface convex toward the object side. The negative lens L1, the positive lens L2, and the positive lens L3 are made of glass.

The second lens group G2 includes, in order from the object side to the image side, a cemented lens formed of a negative lens L4 that has a meniscus shape and has a surface concave toward the image side, a negative lens L5 that has a biconcave shape, and a positive lens L6 that has a meniscus shape facing a surface concave to the object side disposed to be close to the image side of the corresponding negative lens L5. The negative lens L4, the negative lens L5, and the positive lens L6 are made of glass.

The third lens group G3 includes a positive lens L7 that has a meniscus shape and has a surface convex toward the object side. The positive lens L7 is made of glass.

An aperture diaphragm SP is disposed to be close to the object side of the third lens group G3.

The fourth lens group G4 includes a cemented lens formed of a negative lens L8 that has a meniscus shape and has a surface convex toward the object side and a positive lens L9 that has a biconvex shape and is disposed to be close to the image side of the corresponding negative lens L8. The negative lens L8 and the positive lens L9 are made of glass.

The fifth lens group G5 includes, in order from the object side to the image side: a negative lens L10 that is a first lens having a meniscus shape and having a surface concave toward the image side; and a positive lens L11 that is a second lens having a biconvex shape. The negative lens L10 and the positive lens L11 are made of resin (plastic). In order to correct image blur, the positive lens L11 of the fifth lens group functions as an image stabilization lens that is moved in the direction perpendicular to the direction of the optical axis so as to shift the image formed on the image plane in the direction perpendicular to the direction of the optical axis.

The filters FL, FL, and FL are arranged between the fifth lens group G5 and the image plane IMG. As the filter FL, for example, a low-pass filter which prevents occurrence of the moiré pattern, an infrared cut-off filter which is disposed in accordance with spectrum sensitivity characteristics of the imaging device, and the like are used.

Table 7 shows the lens data of Numerical Example 3 of the zoom lens 3, to which specific numerical values are applied, according to the third embodiment.

TABLE 7

| SURFACE NUMBER | RADIUS OF CURVATURE | SURFACE SPACING | REFRACTIVE INDEX | ABBE NUMBER |
|---|---|---|---|---|
| 1 | 15.87910 | 0.158738 | 1.94595 | 18.0 |
| 2 | 5.15329 | 0.338647 | 1.69680 | 55.5 |
| 3 | −33.38116 | 0.023811 | | |
| 4 | 2.89110 | 0.279468 | 1.88300 | 40.8 |
| 5 | 8.69513 | variable | | |
| 6 | 56.90572 | 0.095243 | 1.90366 | 31.3 |
| 7 | 1.45455 | 0.223636 | | |
| 8 | −2.16519 | 0.095243 | 1.83481 | 42.7 |
| 9 | 1.34022 | 0.245779 | 1.94595 | 18.0 |
| 10 | 8.02418 | variable | | |
| 11 (APERTURE DIAPHRAGM) | ∞ | 0.238106 | | |
| 12 | 1.40007(ASP) | 0.285728 | 1.52470 | 56.2 |
| 13 | 41.30996(ASP) | variable | | |
| 14 | 1.94937 | 0.095243 | 1.84666 | 23.8 |
| 15 | 1.17511 | 0.292878 | 1.76802 | 49.2 |
| 16 | −4.55834(ASP) | variable | | |
| 17 | 352.96085 | 0.158738 | 1.58228 | 29.5 |
| 18 | 1.24242 | 0.958881 | | |
| 19 | 7.13478(ASP) | 0.326773 | 1.52470 | 56.2 |
| 20 | −1.59246 | 0.238106 | | |
| 21 | ∞ | 0.068257 | 1.51680 | 64.2 |
| 22 | ∞ | 0.238106 | | |
| 23 | ∞ | 0.120641 | 1.51680 | 64.2 |
| 24 | ∞ | 0.111116 | | |
| 25 | ∞ | 0.079369 | 1.51680 | 64.2 |
| 26 | ∞ | (Bf) | | |

In the zoom lens 3, both surfaces (the twelfth surface and the thirteenth surface) of the positive lens L7 of the third lens group G3, the image side surface (the sixteenth surface) of the positive lens L9 of the fourth lens group G4, and the object side surface (the nineteenth surface) of the positive lens L11 of the fifth lens group G5 are formed to be aspheric. Table 8 shows the 4th-order, 6th-order, 8th-order, and 10th-order aspheric coefficients A, B, C, and D of the aspheric surfaces in Numerical Example 3 together with the conic constant κ.

TABLE 8

| | κ | A | B | C | D |
|---|---|---|---|---|---|
| TWELFTH SURFACE | 0.000000 | 0.643955E−01 | 0.195142E+00 | 0.168104E−01 | 0.781359E−01 |
| THIRTEENTH SURFACE | 0.000000 | 0.137497E+00 | 0.203809E+00 | 0.196884E+00 | 0.781359E−01 |
| SIXTEENTH SURFACE | 0.000000 | 0.595107E−01 | −0.853273E−02 | 0.694923E−02 | 0.781359E−01 |
| NINETEENTH SURFACE | 0.000000 | −0.103740E+00 | 0.218139E−01 | 0.388077E−01 | −0.781359E−01 |

In the zoom lens 3, during zooming between the wide-angle end state and the telephoto end state, the surface spacing d5 between the first lens group G1 and the second lens group G2, the surface spacing d10 between the second lens group G2 and the third lens group G3 (the aperture diaphragm SP), the surface spacing d13 between the third lens group G3 and the fourth lens group G4, and the surface spacing d16 between the fourth lens group G4 and the fifth lens group G5 are varied. Table 9 shows the variable spaces of the surface spacings in the wide-angle end state (f=1.000), the middle focal length state (f=2.122) and the telephoto end state (f=4.500), together with the F number Fno and the angle of view 2ω, in Numerical Example 3.

TABLE 9

| | WIDE-ANGLE END | MIDDLE FOCUS | TELEPHOTO END |
|---|---|---|---|
| f | 1.000 | 2.122 | 4.500 |
| Fno | 3.500 | 3.661 | 3.892 |
| 2ω | 67.135 | 32.687 | 15.160 |
| d5 | 0.143 | 1.107 | 1.820 |
| d10 | 1.900 | 0.936 | 0.222 |
| d13 | 0.839 | 0.553 | 0.317 |
| d16 | 0.238 | 0.524 | 0.760 |
| Bf | 0.127 | 0.127 | 0.127 |

Figure 17:
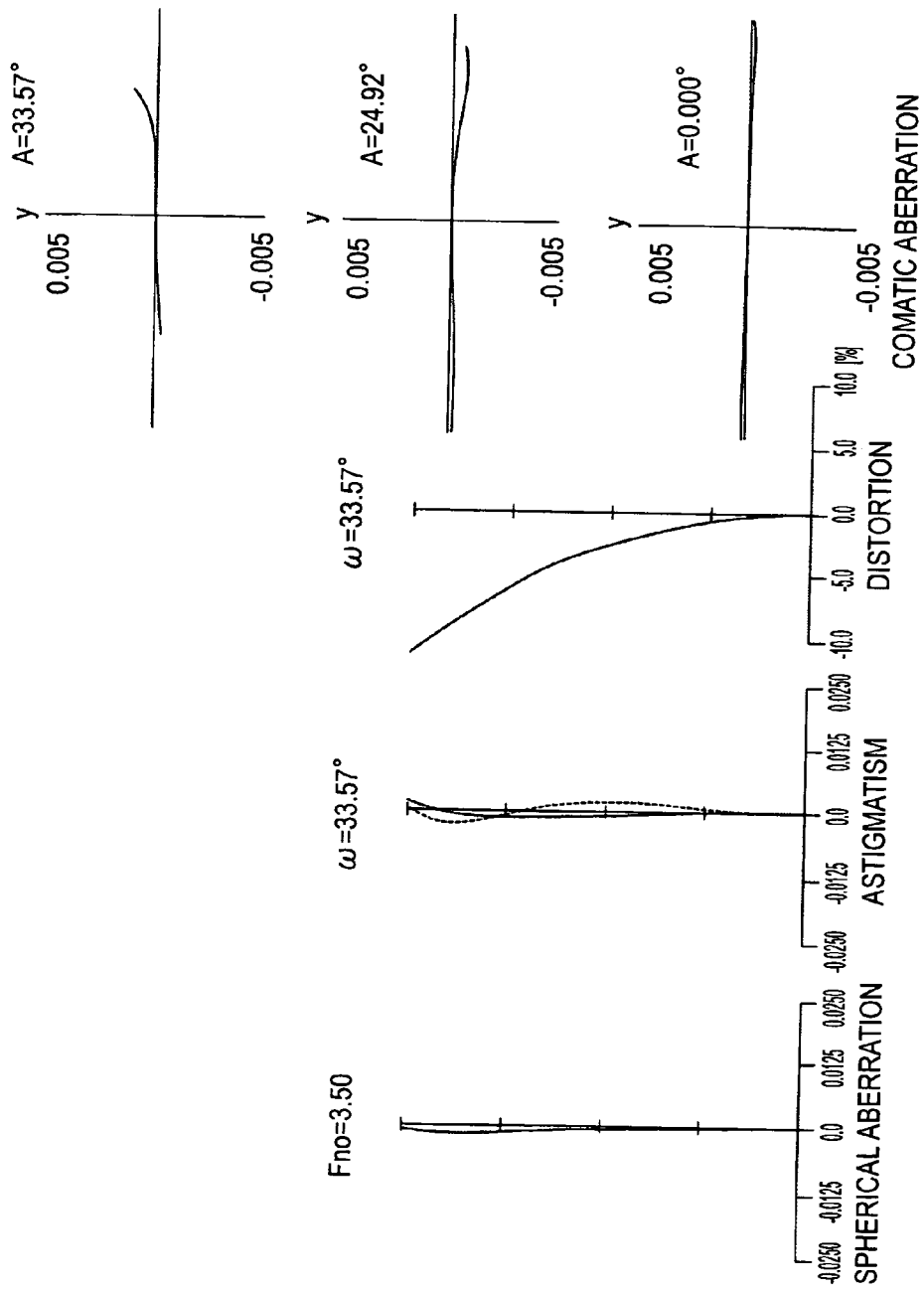
FIG. 17 is a diagram illustrating aberrations in a numerical example of the third embodiment to which specific numerical values are applied, together with FIGS. 18 and 19, the diagram illustrating spherical aberration, astigmatism, distortion, and comatic aberration in the wide-angle end state.
Figure 18:
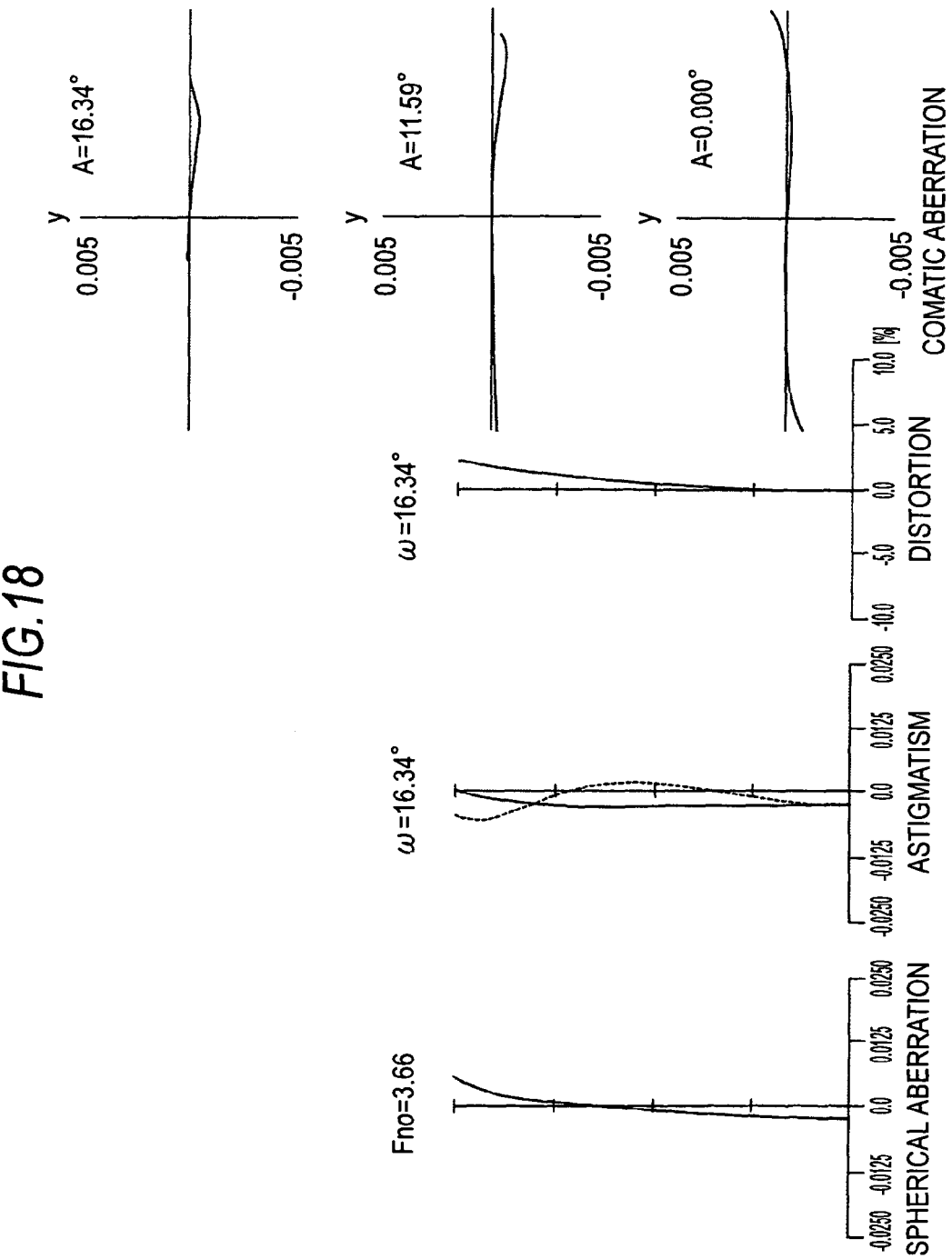
FIG. 18 is a diagram illustrating spherical aberration, astigmatism, distortion, and comatic aberration in the middle focal length state.
Figure 19:
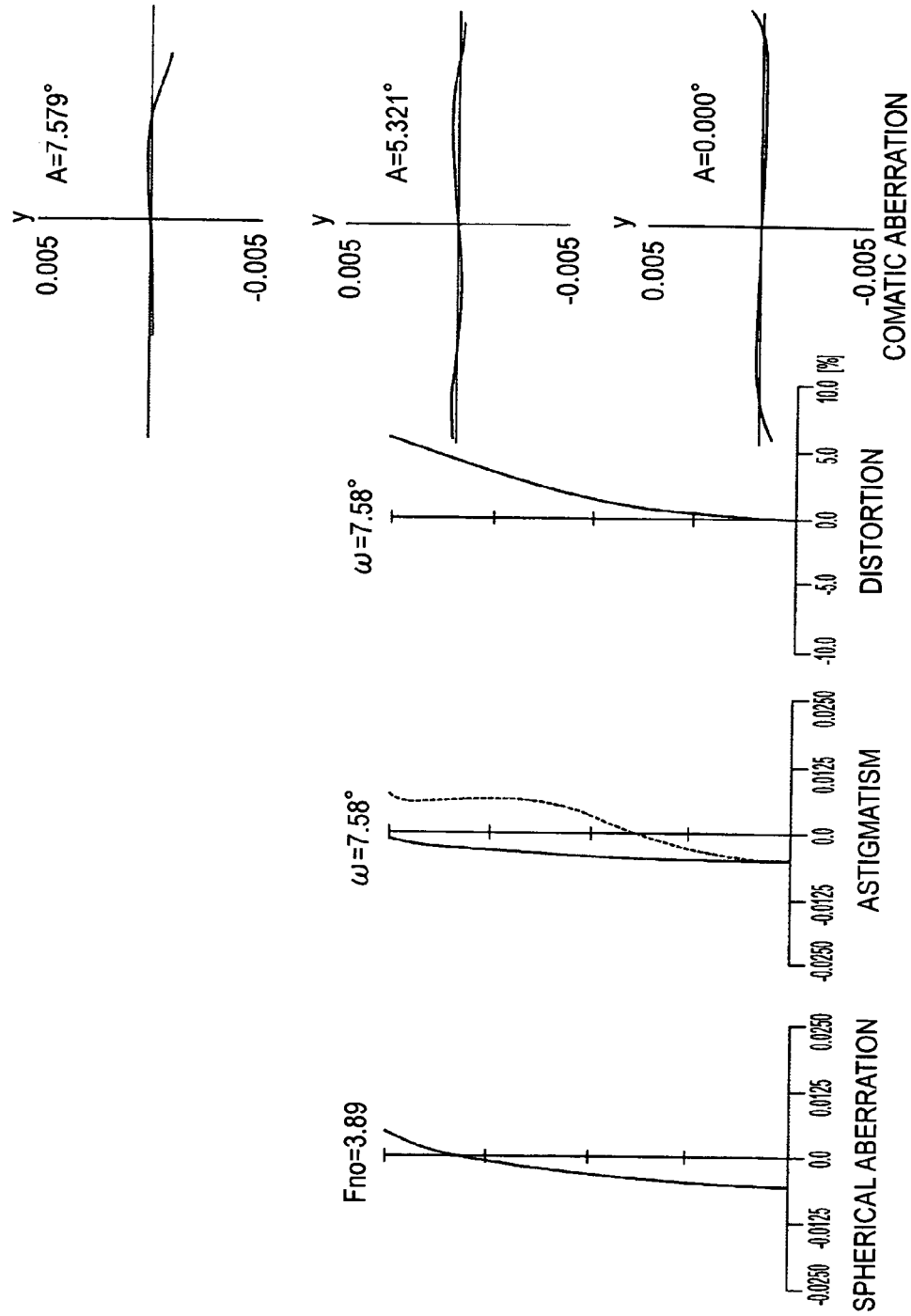
FIG. 19 is a diagram illustrating spherical aberration, astigmatism, distortion, and comatic aberration in the telephoto end state.

FIGS. 17 to 19 show various aberration diagrams in the infinite focus condition of Numerical Example 3. FIG. 17 shows various aberration diagrams in the wide-angle end state (f=1.000). FIG. 18 shows various aberration diagrams in the middle focal length state (f=2.122). FIG. 19 shows various aberration diagrams in the telephoto end state (f=4.500).

In each astigmatism diagram of FIGS. 17 to 19, the solid line represents a value on the sagittal image plane, and the dashed line shows a value on the meridional image plane. In each comatic aberration diagram, A represents the angle of view, and y represents the image height.

Figure 20:
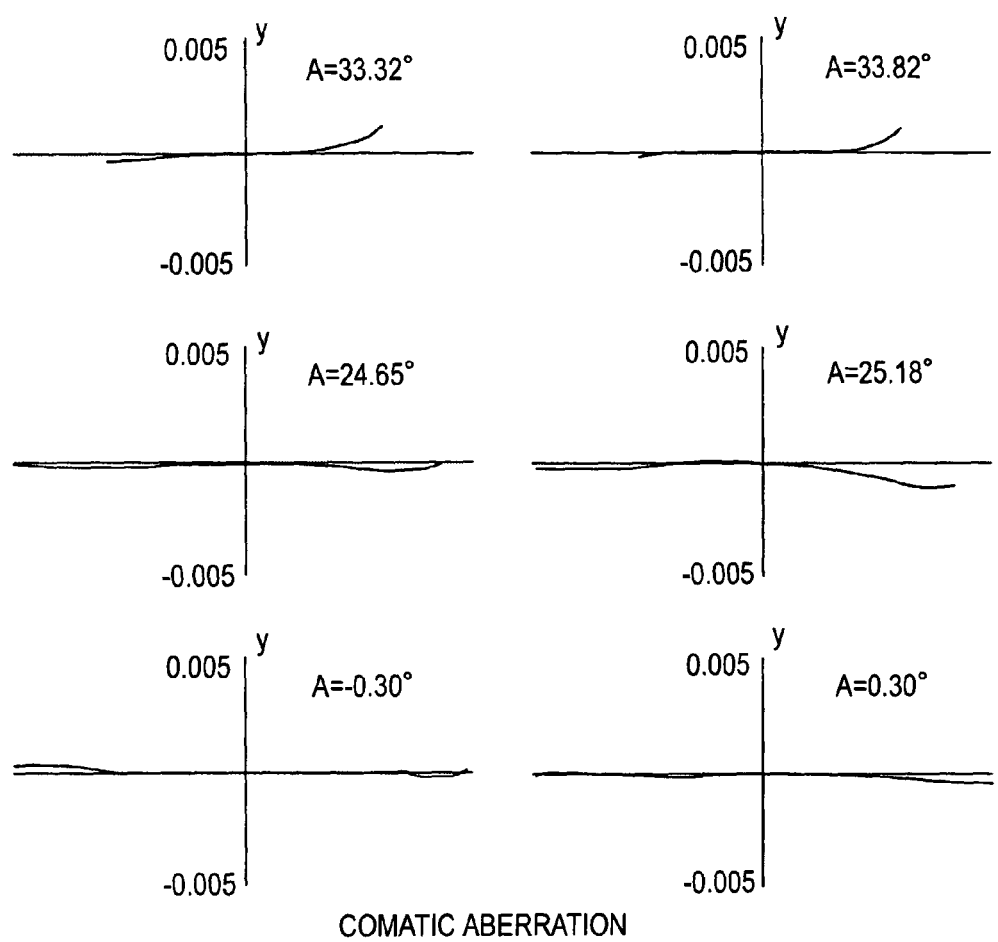
FIG. 20 is a diagram illustrating aberration in the lens shift condition of 0.3 degrees in the numerical example of the third embodiment to which specific numerical values are applied, together with FIGS. 21 and 22, the diagram illustrating comatic aberration in the wide-angle end state.
Figure 21:
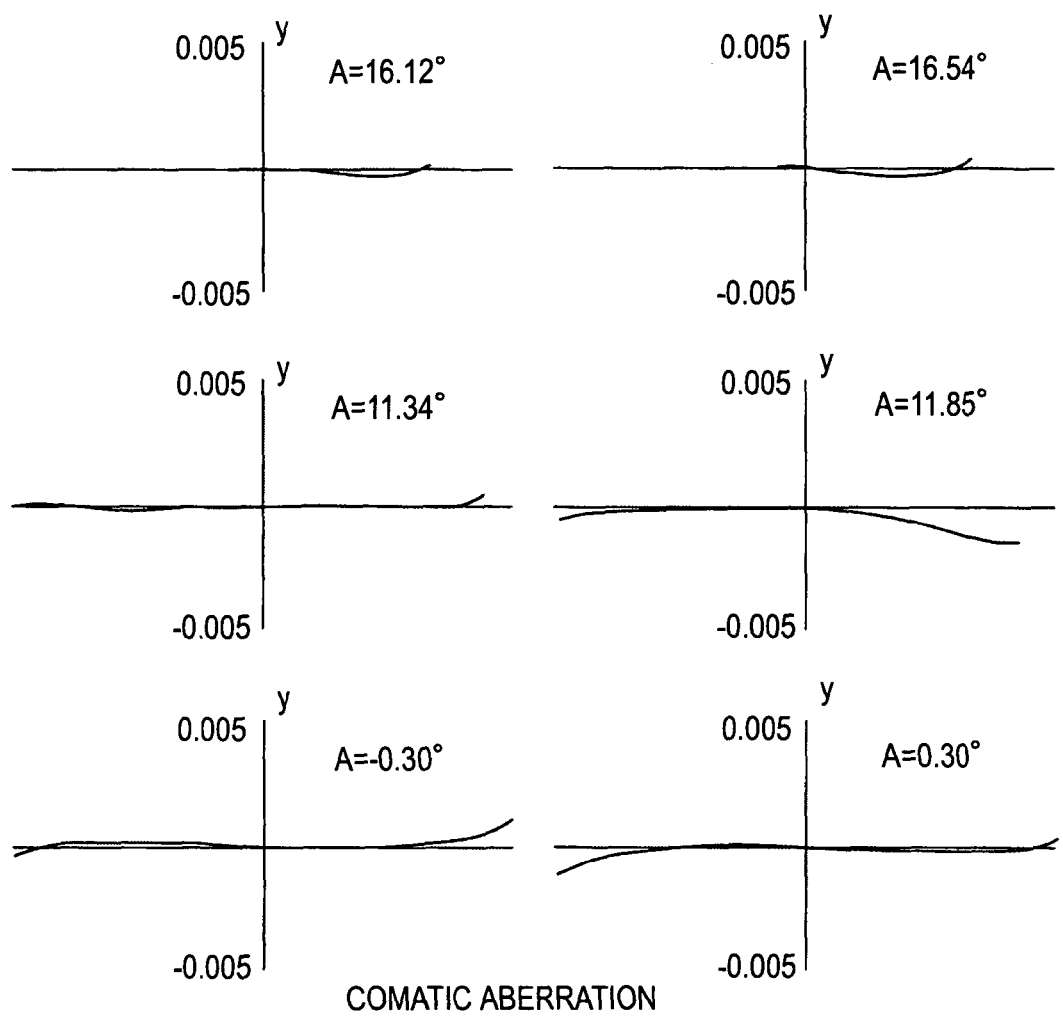
FIG. 21 is a diagram illustrating spherical aberration, astigmatism, distortion, and comatic aberration in the middle focal length state.
Figure 22:
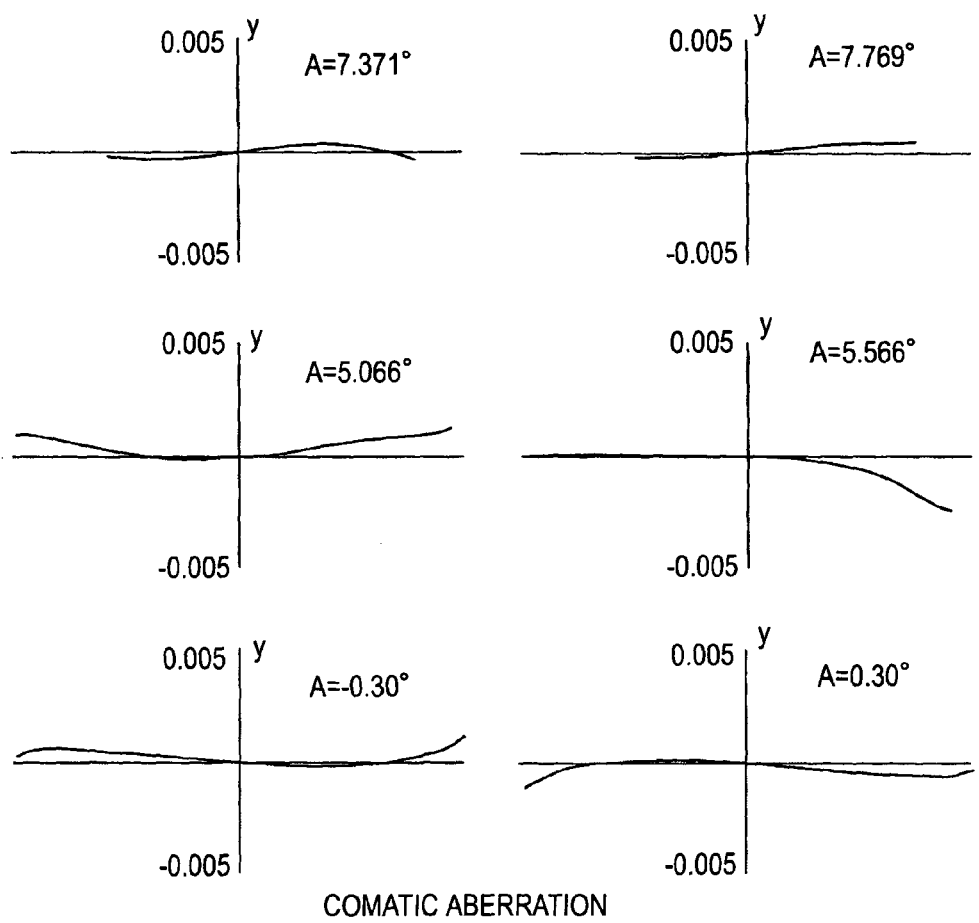
FIG. 22 is a diagram illustrating spherical aberration, astigmatism, distortion, and comatic aberration in the telephoto end state.

FIGS. 20 to 22 show comatic aberration diagrams in the lens shift condition (the condition in which the positive lens L11 of the fifth lens group G5 is moved in the direction perpendicular to the direction of the optical axis) of 0.3 degrees relative to the infinite focus condition of Numerical Example 3. FIG. 20 shows comatic aberration diagrams in the wide-angle end state (f=1.000). FIG. 21 shows comatic aberration diagrams in the middle focal length state (f=2.122). FIG. 22 shows comatic aberration diagrams in the telephoto end state (f=4.500).

As can be seen from the aberration diagrams, in Numerical Example 3, it is possible to obtain an excellent imaging performance by satisfactorily correcting various aberrations.

Fourth Embodiment

Figure 23:
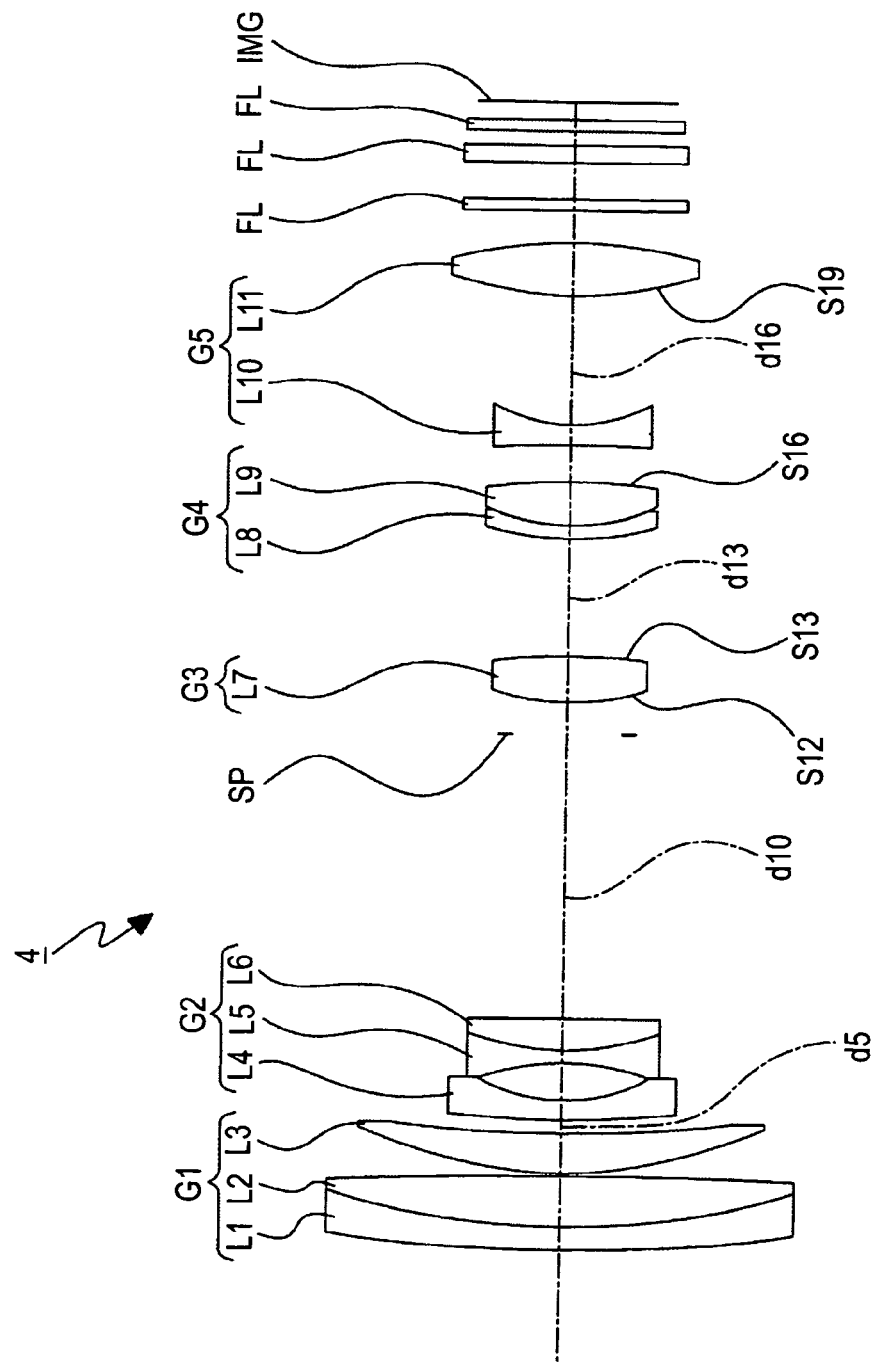
FIG. 23 is a diagram illustrating a lens configuration of a zoom lens according to a fourth embodiment of the invention.

FIG. 23 shows the lens configuration of the zoom lens 4 according to the fourth embodiment of the invention. The zoom lens 4 has eleven lenses.

The zoom lens 4 includes, in order from the object side to the image side: the first lens group G1 that has a positive refractive power; the second lens group G2 that has a negative refractive power; the third lens group G3 that has a positive refractive power; the fourth lens group G4 that has a positive refractive power; and the fifth lens group G5 that has a small negative refractive power.

In the zoom lens 4, the zoom ratio is set to be 4.5 times.

The first lens group G1 includes, from the object side to the image side: a cemented lens formed of a negative lens L1 that has a meniscus shape and has a surface convex toward the object side and a positive lens L2 that has a biconvex shape and is disposed to be close to the image side of the negative lens L1; and a positive lens L3 that has a meniscus shape and has a surface convex toward the object side. The negative lens L1, the positive lens L2, and the positive lens L3 are made of glass.

The second lens group G2 includes, in order from the object side to the image side, a cemented lens formed of a negative lens L4 that has a meniscus shape and has a surface concave toward the image side, a negative lens L5 that has a biconcave shape, and a positive lens L6 that has a plano-convex shape facing a convex surface and is disposed to be close to the image side of the corresponding negative lens L5. The negative lens L4, the negative lens L5, and the positive lens L6 are made of glass.

The third lens group G3 includes a positive lens L7 that has a biconvex shape. The positive lens L7 is made of glass.

An aperture diaphragm SP is disposed to be close to the object side of the third lens group G3.

The fourth lens group G4 includes a cemented lens formed of a negative lens L8 that has a meniscus shape and has a surface convex toward the object side and a positive lens L9 that has a biconvex shape and is disposed to be close to the image side of the corresponding negative lens L8. The negative lens L8 and the positive lens L9 are made of glass.

The fifth lens group G5 includes, in order from the object side to the image side: a negative lens L10 that is a first lens having a biconcave shape; and a positive lens L11 that is a second lens having a biconvex shape. The negative lens L10 and the positive lens L11 are made of resin (plastic). In order to correct image blur, the positive lens L11 of the fifth lens group functions as an image stabilization lens that is moved in the direction perpendicular to the direction of the optical axis so as to shift the image formed on the image plane in the direction perpendicular to the direction of the optical axis.

The filters FL, FL, and FL are arranged between the fifth lens group G5 and the image plane IMG. As the filter FL, for example, a low-pass filter which prevents occurrence of the moiré pattern, an infrared cut-off filter which is disposed in accordance with spectrum sensitivity characteristics of the imaging device, and the like are used.

Table 10 shows the lens data of Numerical Example 4 of the zoom lens 4, to which specific numerical values are applied, according to the fourth embodiment.

TABLE 10

| SURFACE NUMBER | RADIUS OF CURVATURE | SURFACE SPACING | REFRACTIVE INDEX | ABBE NUMBER |
|---|---|---|---|---|
| 1 | 12.22554 | 0.158735 | 1.94595 | 18.0 |
| 2 | 4.80954 | 0.351690 | 1.69680 | 55.5 |
| 3 | −35.31917 | 0.023810 | | |
| 4 | 3.10784 | 0.276445 | 1.88300 | 40.8 |
| 5 | 9.03050 | variable | | |
| 6 | 75.93258 | 0.095241 | 1.90366 | 31.3 |
| 7 | 1.26370 | 0.229365 | | |
| 8 | −1.86544 | 0.095853 | 1.83481 | 42.7 |
| 9 | 1.60720 | 0.230113 | 1.94595 | 18.0 |
| 10 | ∞ | variable | | |
| 11 | ∞ | 0.238102 | | |

TABLE 10-continued

| SURFACE NUMBER | RADIUS OF CURVATURE | SURFACE SPACING | REFRACTIVE INDEX | ABBE NUMBER |
|---|---|---|---|---|
| (APERTURE DIAPHRAGM) | | | | |
| 12 | 1.70215(ASP) | 0.285722 | 1.52470 | 56.2 |
| 13 | −5.22154(ASP) | variable | | |
| 14 | 2.08834 | 0.095629 | 1.92286 | 20.9 |
| 15 | 1.22931 | 0.299490 | 1.76802 | 49.2 |
| 16 | −3.56426(ASP) | variable | | |
| 17 | −15.28778 | 0.159054 | 1.58228 | 29.5 |
| 18 | 1.01962 | 0.896031 | | |
| 19 | 2.66535(ASP) | 0.348081 | 1.52470 | 56.2 |
| 20 | −2.97199 | 0.238653 | | |
| 21 | ∞ | 0.068256 | 1.51680 | 64.2 |
| 22 | ∞ | 0.238102 | | |
| 23 | ∞ | 0.120638 | 1.55232 | 63.4 |
| 24 | ∞ | 0.111114 | | |
| 25 | ∞ | 0.079367 | 1.51680 | 64.2 |
| 26 | ∞ | (Bf) | | |

In the zoom lens 4, both surfaces (the twelfth surface and the thirteenth surface) of the positive lens L7 of the third lens group G3, the image side surface (the sixteenth surface) of the positive lens L9 of the fourth lens group G4, and the object side surface (the nineteenth surface) of the positive lens L11 of the fifth lens group G5 are formed to be aspheric. Table 11 shows the 4th-order, 6th-order, 8th-order, and 10th-order aspheric coefficients A, B, C, and D of the aspheric surfaces in Numerical Example 4 together with the conic constant κ.

TABLE 11

| | κ | A | B | C | D |
|---|---|---|---|---|---|
| TWELFTH SURFACE | 0.000000 | −0.160838E−01 | 0.403442E−01 | 0.196911E−01 | 0.781497E−01 |
| THIRTEENTH SURFACE | 0.000000 | 0.469514E−01 | 0.343842E−01 | 0.196911E−01 | −0.146431E−01 |
| SIXTEENTH SURFACE | 0.000000 | 0.450660E−01 | 0.855803E−02 | −0.196911E−01 | 0.606103E−01 |
| NINETEENTH SURFACE | 0.000000 | −0.232031E−01 | 0.992300E−02 | 0.196911E−01 | −0.245483E−01 |

In the zoom lens 4, during zooming between the wide-angle end state and the telephoto end state, the surface spacing d5 between the first lens group G1 and the second lens group G2, the surface spacing d10 between the second lens group G2 and the third lens group G3 (the aperture diaphragm SP), the surface spacing d13 between the third lens group G3 and the fourth lens group G4, and the surface spacing d16 between the fourth lens group G4 and the fifth lens group G5 are varied. Table 12 shows the variable spaces of the surface spacings in the wide-angle end state (f=1.000), the middle focal length state (f=2.124) and the telephoto end state (f=4.500), together with the F number Fno and the angle of view 2ω, in Numerical Example 4.

TABLE 12

| | WIDE-ANGLE END | MIDDLE FOCUS | TELEPHOTO END |
|---|---|---|---|
| f | 1.000 | 2.124 | 4.500 |
| Fno | 3.500 | 3.609 | 3.812 |
| 2ω | 68.321 | 31.200 | 14.652 |
| d5 | 0.143 | 1.151 | 1.876 |
| d10 | 1.955 | 0.948 | 0.222 |
| d13 | 0.826 | 0.554 | 0.317 |

TABLE 12-continued

| | WIDE-ANGLE END | MIDDLE FOCUS | TELEPHOTO END |
|---|---|---|---|
| d16 | 0.239 | 0.501 | 0.748 |
| Bf | 0.127 | 0.127 | 0.127 |

Figure 24:
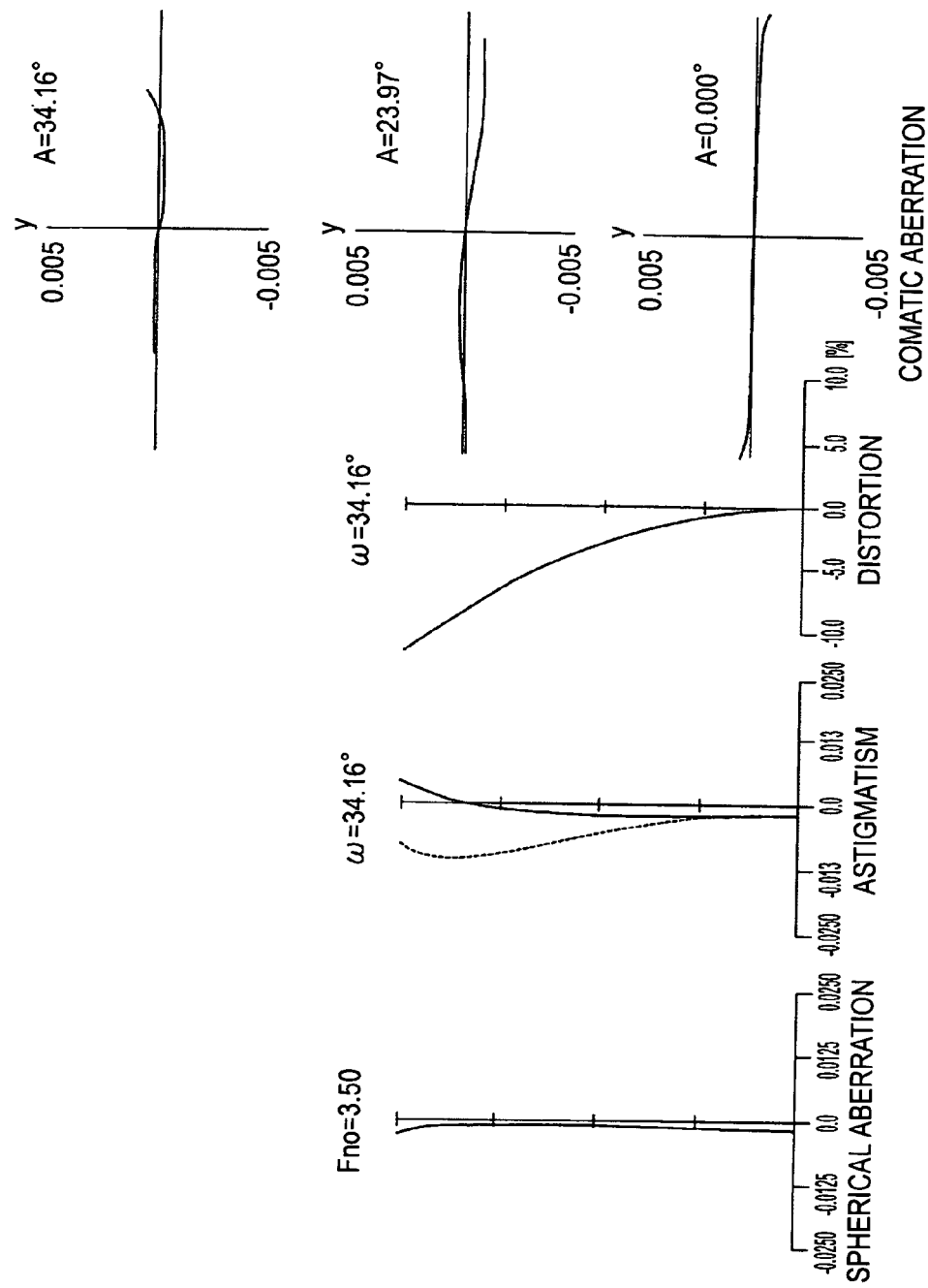
FIG. 24 is a diagram illustrating aberrations in a numerical example of the fourth embodiment to which specific numerical values are applied, together with FIGS. 25 and 26, the diagram illustrating spherical aberration, astigmatism, distortion, and comatic aberration in the wide-angle end state.
Figure 25:
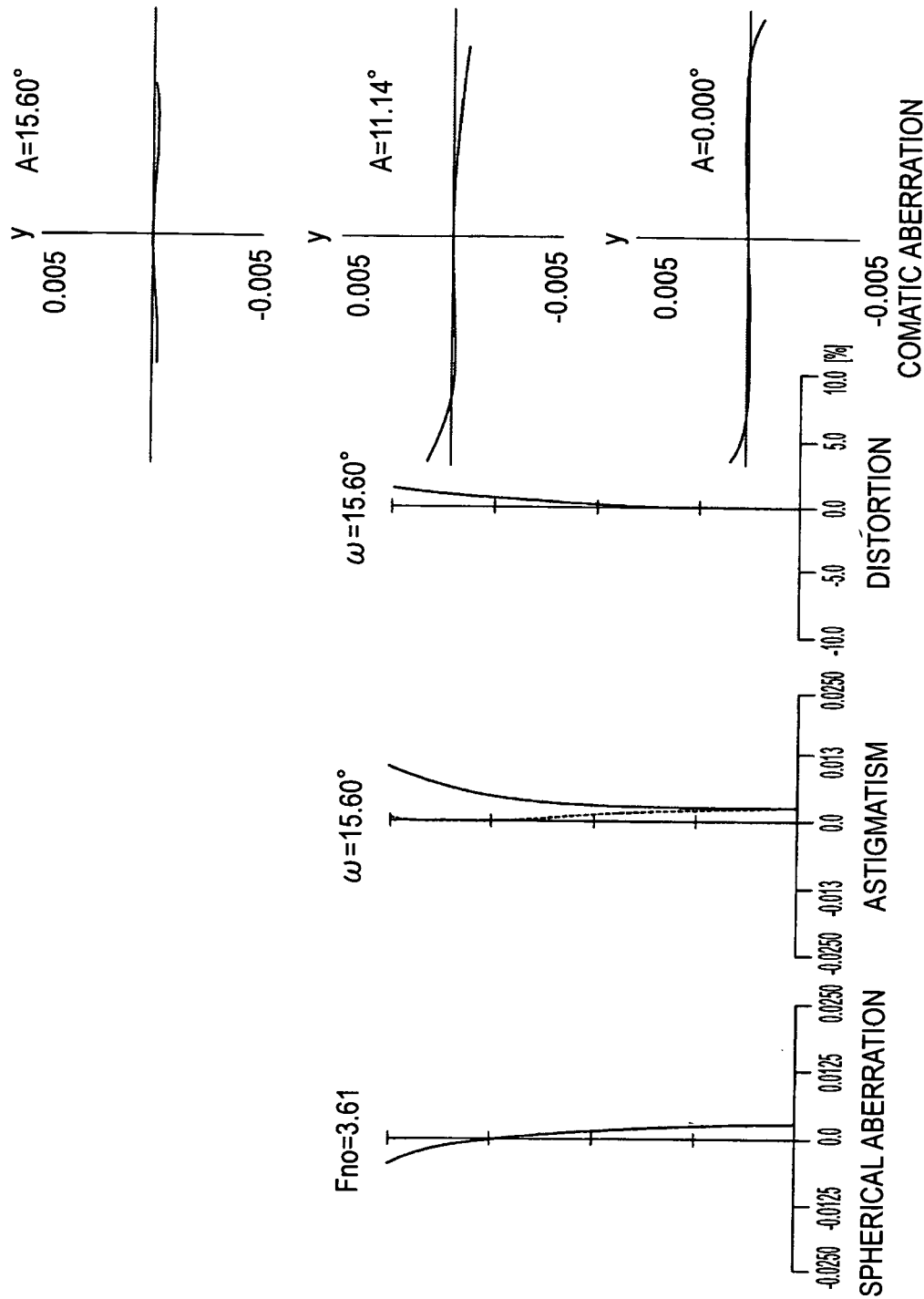
FIG. 25 is a diagram illustrating spherical aberration, astigmatism, distortion, and comatic aberration in the middle focal length state.
Figure 26:
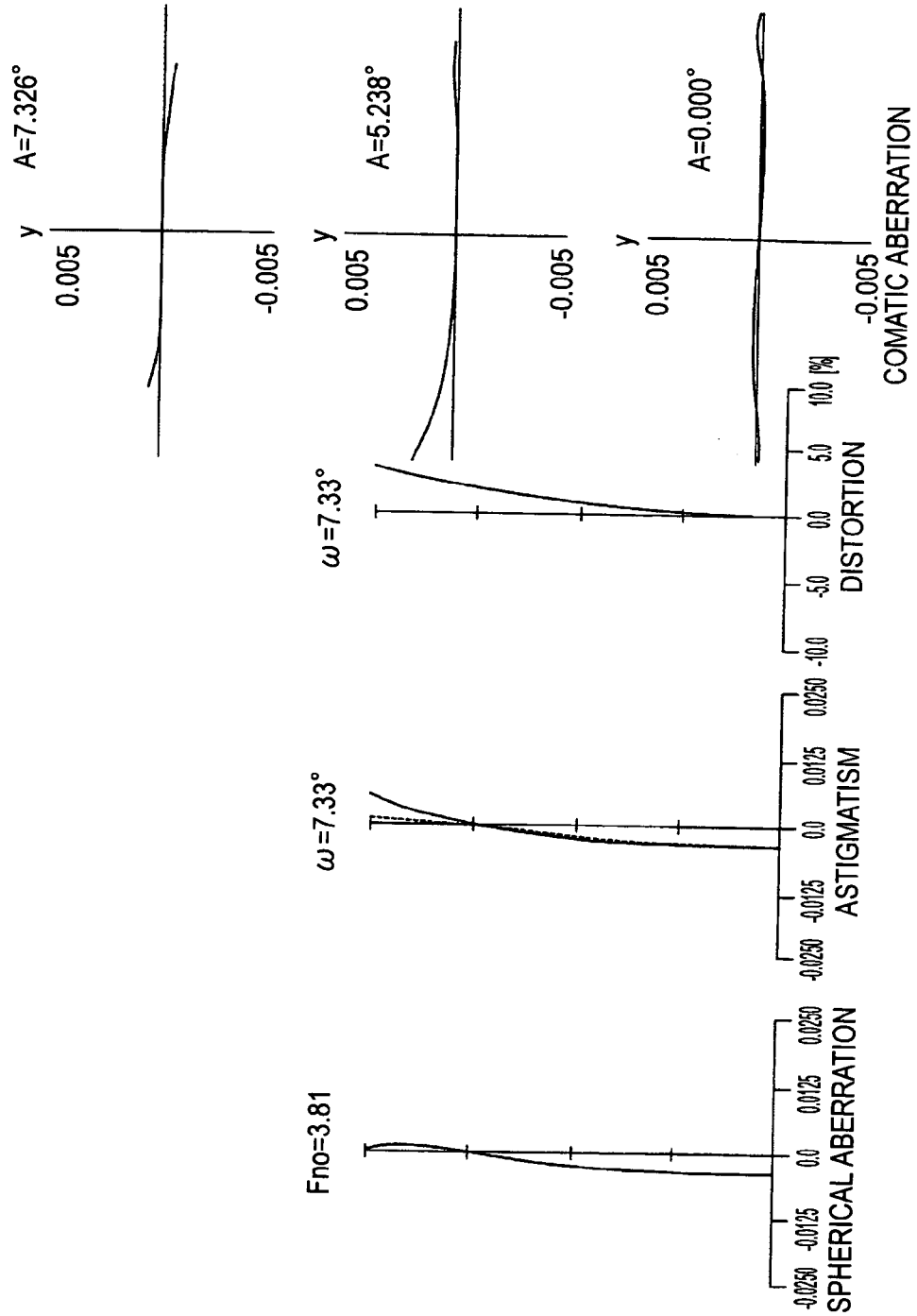
FIG. 26 is a diagram illustrating spherical aberration, astigmatism, distortion, and comatic aberration in the telephoto end state.

FIGS. 24 to 26 show various aberration diagrams in the infinite focus condition of Numerical Example 4. FIG. 24 shows various aberration diagrams in the wide-angle end state (f=1.000). FIG. 25 shows various aberration diagrams in the middle focal length state (f=2.124). FIG. 26 shows various aberration diagrams in the telephoto end state (f=4.500).

In each astigmatism diagram of FIGS. 24 to 26, the solid line represents a value on the sagittal image plane, and the dashed line shows a value on the meridional image plane. In each comatic aberration diagram, A represents the angle of view, and y represents the image height.

Figure 27:
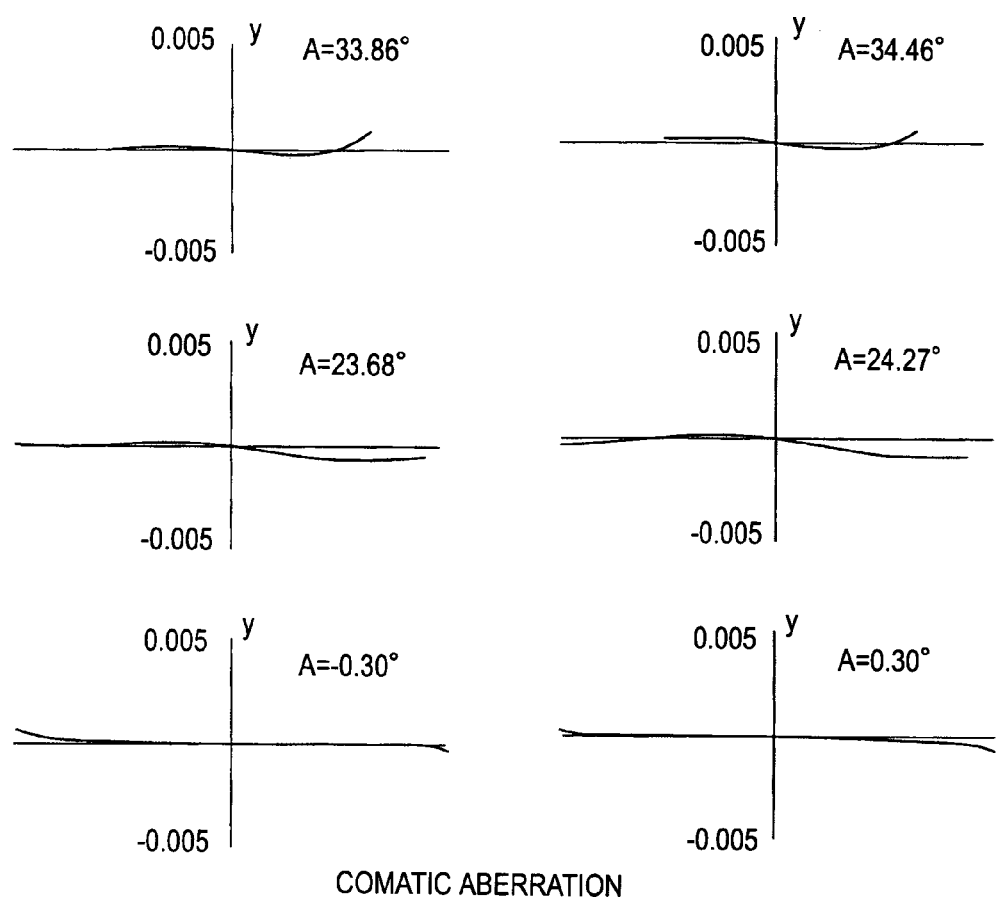
FIG. 27 is a diagram illustrating aberration in the lens shift condition of 0.3 degrees in the numerical example of the fourth embodiment to which specific numerical values are applied, together with FIGS. 28 and 29, the diagram illustrating comatic aberration in the wide-angle end state.
Figure 28:
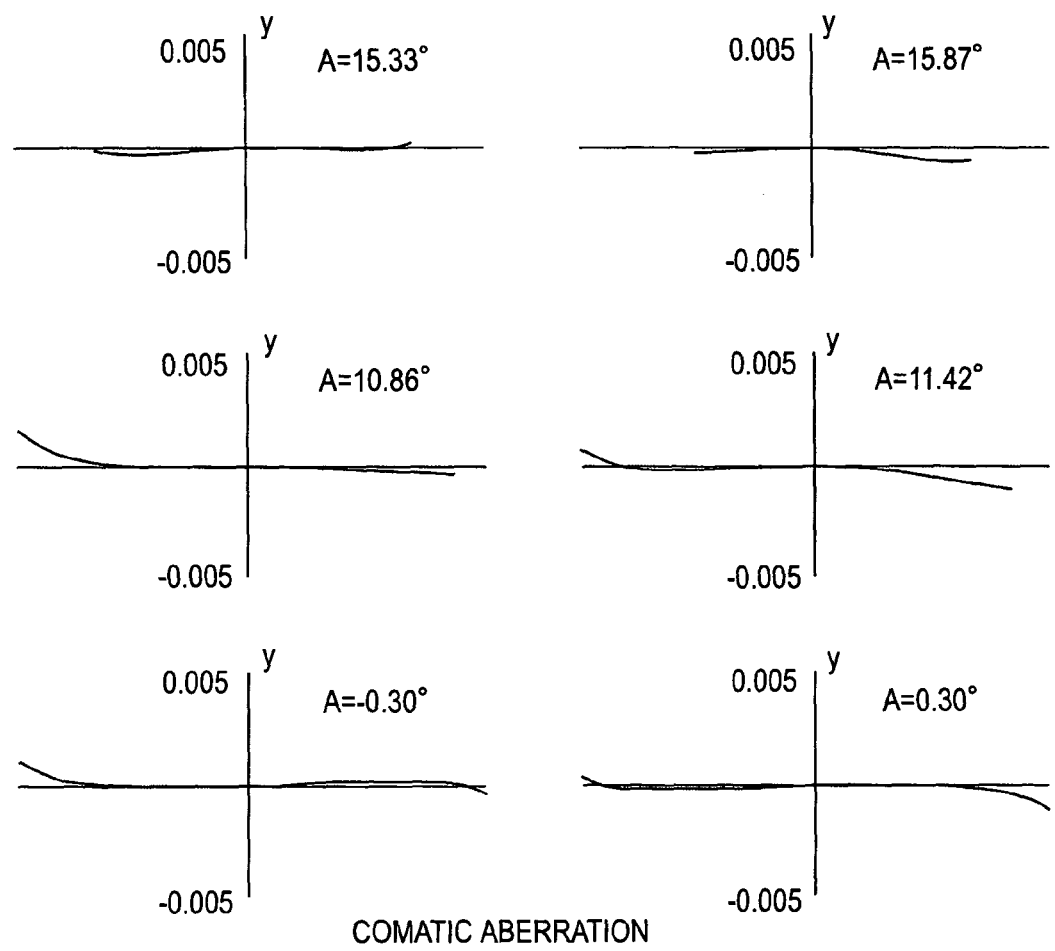
FIG. 28 is a diagram illustrating spherical aberration, astigmatism, distortion, and comatic aberration in the middle focal length state.
Figure 29:
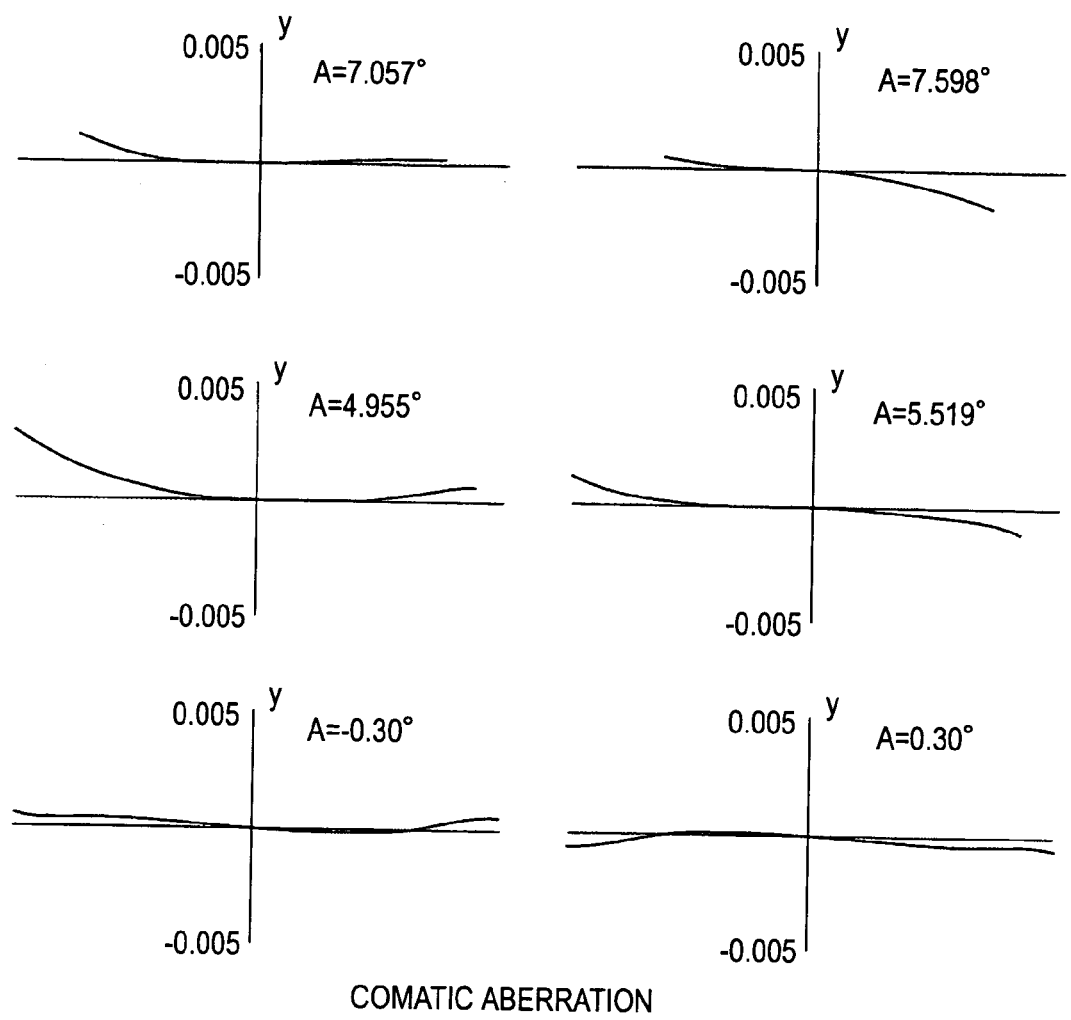
FIG. 29 is a diagram illustrating spherical aberration, astigmatism, distortion, and comatic aberration in the telephoto end state.

FIGS. 27 to 29 show comatic aberration diagrams in the lens shift condition (the condition in which the positive lens L11 of the fifth lens group G5 is moved in the direction perpendicular to the direction of the optical axis) of 0.3 degrees relative to the infinite focus condition of Numerical Example 4. FIG. 27 shows comatic aberration diagrams in the wide-angle end state (f=1.000). FIG. 28 shows comatic aberration diagrams in the middle focal length state (f=2.124). FIG. 29 shows comatic aberration diagrams in the telephoto end state (f=4.500).

As can be seen from the aberration diagrams, in Numerical Example 4, it is possible to obtain an excellent imaging performance by satisfactorily correcting various aberrations.

[Values of Conditional Expression of Zoom Lens]

Hereinafter, the values of the conditional expressions of the zoom lens according to the embodiment of the invention will be described.

Table 13 shows the values of conditional expressions (1) to (8) of the zoom lenses 1 to 4.

TABLE 13

| | | ZOOM LENS 1 | ZOOM LENS 2 | ZOOM LENS 3 | ZOOM LENS 4 |
|---|---|---|---|---|---|
| | f3 | 2.964 | 3.662 | 2.744 | 2.471 |
| | f4 | 1.966 | 1.996 | 1.999 | 1.929 |
| CONDITIONAL EXPRESSION(1) | f3/f4 | 1.508 | 1.835 | 1.372 | 1.281 |
| CONDITIONAL EXPRESSION(2) | $|\beta 2w|$ | 0.300 | 0.303 | 0.336 | 0.306 |
| | H1' | −0.242 | −0.213 | −0.253 | −0.258 |
| | f1 | 4.437 | 4.379 | 4.164 | 4.267 |
| CONDITIONAL EXPRESSION(3) | H1'/f1 | −0.055 | −0.049 | −0.061 | −0.060 |
| CONDITIONAL EXPRESSION(4) | $\beta 5$ | 1.503 | 1.485 | 1.402 | 1.644 |
| | f5P | 2.342 | 2.422 | 2.503 | 2.725 |
| | ft | 5.000 | 6.003 | 4.500 | 4.500 |
| CONDITIONAL EXPRESSION(5) | f5P/ft | 0.468 | 0.403 | 0.556 | 0.606 |
| | f5n | −1.992 | −2.350 | −2.125 | −1.623 |
| CONDITIONAL EXPRESSION(6) | f5n/f5P | −0.851 | −0.970 | −0.849 | −0.596 |
| CONDITIONAL EXPRESSION(7) | v5a | 29.5 | 29.5 | 29.5 | 29.5 |
| CONDITIONAL EXPRESSION(8) | v5b | 56.2 | 56.2 | 56.2 | 56.2 |

As can be clearly seen from Table 13, the zoom lenses 1 to 4 are configured to satisfy the conditional expressions (1) to (8).

[Configuration of Imaging Apparatus]

Hereinafter, the imaging apparatus according to the embodiment of the invention will be described.

The imaging apparatus according to the embodiment of the invention includes: a zoom lens; and an imaging device that converts an optical image, which is formed by the zoom lens, into an electric signal.

In the imaging apparatus according to the embodiment of the invention, the zoom lens includes, in order from the object side to the image side: a first lens group that has a positive refractive power; a second lens group that has a negative refractive power; a third lens group that has a positive refractive power; a fourth lens group that has a positive refractive power; and a fifth lens group that has a positive refractive power.

Further, in the imaging apparatus according to the embodiment of the invention, the zoom lens may include, in order from the object side to the image side: a first lens group that has a positive refractive power; a second lens group that has a negative refractive power; a third lens group that has a positive refractive power; a fourth lens group that has a positive refractive power; and a fifth lens group that has a negative refractive power.

The first lens group remains stationary in the direction of the optical axis, the second lens group is movable on the optical axis so as to perform a zoom operation, and the third lens group remains stationary in the direction of the optical axis during zooming and focusing. The fourth lens group is movable on the optical axis so as to correct fluctuation in imaging position and correct change in imaging position caused by change in object distance; and the fifth lens group remains stationary in the direction of the optical axis.

The fifth lens group includes, in order from the object side to the image side, a first lens that has a negative refractive power and remains stationary in the direction of the optical axis, and a second lens that has a positive refractive power and is movable in a direction perpendicular to the direction of the optical axis.

In the imaging apparatus according to the embodiment of the invention, the zoom lens is configured so that, by moving the second lens of the fifth lens group in the direction perpendicular to the direction of the optical axis, an image formed on an image plane can be shifted in the direction perpendicular to the direction of the optical axis.

Further, in the imaging apparatus according to the embodiment of the invention, the zoom lens is configured to satisfy the following conditional expressions (1) to (4).

$$1.0 < f3/f4 < 2.0, \quad (1)$$

$$0.25 < |\beta 2w| < 0.4, \quad (2)$$

$$-0.065 < H1'/f1 < -0.045, \text{ and} \quad (3)$$

$$1.1 < \beta 5 < 1.7, \quad (4)$$

where f3 is a composite focal length of the third lens group, f4 is a composite focal length of the fourth lens group, β2w is an imaging magnification of the second lens group in a wide-angle end state, H1' is a space between a vertex of a surface of the first lens group closest to the image side and a principal point of the first lens group close to the image side when the sign "−" represents the object side and the sign "+" represents the image side, f1 is a composite focal length of the first lens group, and β5 is an imaging magnification of the fifth lens group.

In the imaging apparatus according to the embodiment of the invention, by satisfying the conditional expressions (1) to (4), it is possible to shorten the entire length of the optical system and correct aberrations in the wide-angle end and middle focus range.

The conditional expression (1) defines the ratio of the refractive power of the third lens group, which has a positive refractive power and remains stationary in the direction of the optical axis, to the refractive power of the fourth lens group which is movable to perform focusing.

When the lower limit of the conditional expression (1) is exceeded, the refractive power of the third lens group becomes too large, or the refractive power of the fourth lens group becomes too small. If the refractive power of the third lens group becomes too large, the spherical aberration is insufficiently corrected on the wide-angle side, and it is difficult to perform the correction because of the fluctuation of spherical aberration during focusing at the middle zoom position. If the refractive power of the fourth lens group becomes too small, the shift amount during focusing increases, and thus fluctuation in aberrations such as image field curvature and comatic aberration increases. Further, since the back focal length unnecessarily increases, it is difficult to shorten the entire length of the optical system.

In contrast, when the upper limit of the conditional expression (1) is exceeded, the refractive power of the third lens group becomes too small, or the refractive power of the fourth lens group becomes too large. If the refractive power of the third lens group becomes too small, the spherical aberration is corrected too much on the wide-angle side. If the refractive power of the fourth lens group becomes too large, the spherical aberration is insufficiently corrected on the wide-angle side.

Accordingly, by making the zoom lens satisfy the conditional expression (1), it is possible to satisfactorily correct aberrations on the wide-angle side and at the middle zoom position, and it is possible to shorten the entire length of the optical system.

The conditional expression (2) defines the range of the magnification (imaging magnification) of the second lens group in the wide-angle end state.

When the upper limit of the conditional expression (2) is exceeded, the magnification of the second lens group at the wide-angle end becomes too large, the focal length of the whole lens system becomes too close to the telephoto end side, and thus it is difficult to obtain the desirable zoom ratio.

In contrast, when the lower limit of the conditional expression (2) is exceeded, this is advantageous in order to achieve high zoom power, but the focal length of the whole lens system becomes too close to the wide-angle end side, and thus the diameter of the lens positioned to be closest to the object side in the first lens group increases. As a result, the whole lens system increases in size.

Accordingly, by making the zoom lens satisfy the conditional expression (2), it is possible to secure the desirable zoom ratio and reduce the size of the whole lens system.

The conditional expression (3) defines the ratio of the space, which exists between the focus of the surface closest to the image side in the first lens group and the image side principal point of the first lens group, to the size of the focal length of the first lens group. The expression is the necessity to reduce the space between the principal points of the first lens group and the second lens group.

When the lower limit of the conditional expression (3) is exceeded, the position of the principal point of the first lens group becomes too close to the object side. Hence, it is difficult to reduce the space between the principal points of the first lens group and the second lens group, and thus it is difficult to increase the angle of view.

In contrast, when the upper limit of the conditional expression (3) is exceeded, the space between the first lens group and the second lens group becomes large, and thus the diameter of the lens, which is disposed to be closest to the object side in the first lens group, increases. As a result, the whole lens system increases in size.

Accordingly, by making the zoom lens satisfy the conditional expression (3), it is possible to increase the angle of view at the focal length in the wide-angle end state, and it is also possible to shorten the entire length of the optical system.

The conditional expression (4) defines the imaging magnification of the fifth lens group.

When the lower limit of the conditional expression (4) is exceeded, the imaging magnification of the fifth lens group becomes too small, and thus it becomes insufficient to shorten the entire length of the optical system.

In contrast, when the upper limit of the conditional expression (4) is exceeded, the imaging magnification of the fifth lens group becomes too large, and thus the entire length of the optical system is shortened, but it becomes difficult to secure a predetermined back focal length. Further, since the distance from the exit pupil to the image plane decreases, the telecentricity is lowered, and thus this is undesirable when being applied to, for example, the video cameras and the like.

Accordingly, by making the zoom lens satisfy the conditional expression (4), the refractive power of the fifth lens group becomes a positive or negative small refractive power. Thus, it is possible to shorten the entire length of the optical system, and it is also possible to secure favorable optical performance throughout the whole screen.

By making the zoom lens satisfy the conditional expression (4), the refractive power of the fifth lens group becomes the positive or negative small refractive power, and thus it is possible to deal with a large image plane without increasing the incident angle to the image plane (the imager). Further, since the refractive power of the fifth lens group is small, it is possible to reduce fluctuation in aberrations caused when the image formed on the image plane is shifted in the direction perpendicular to the direction of the optical axis by moving the lens, which is disposed in the fifth lens group, in the direction perpendicular to the direction of the optical axis. Moreover, by providing a lens, which shifts the image in the direction perpendicular to the direction of the optical axis, in the fifth lens group, it is possible to reduce the size of the system of the lens disposed to be closest to the object side in the first lens group.

In the zoom lens according to the embodiment of the invention, it is preferable that the zoom ratio should be 4.5 to 6 times.

[Embodiment of Imaging Apparatus]

Figure 30:
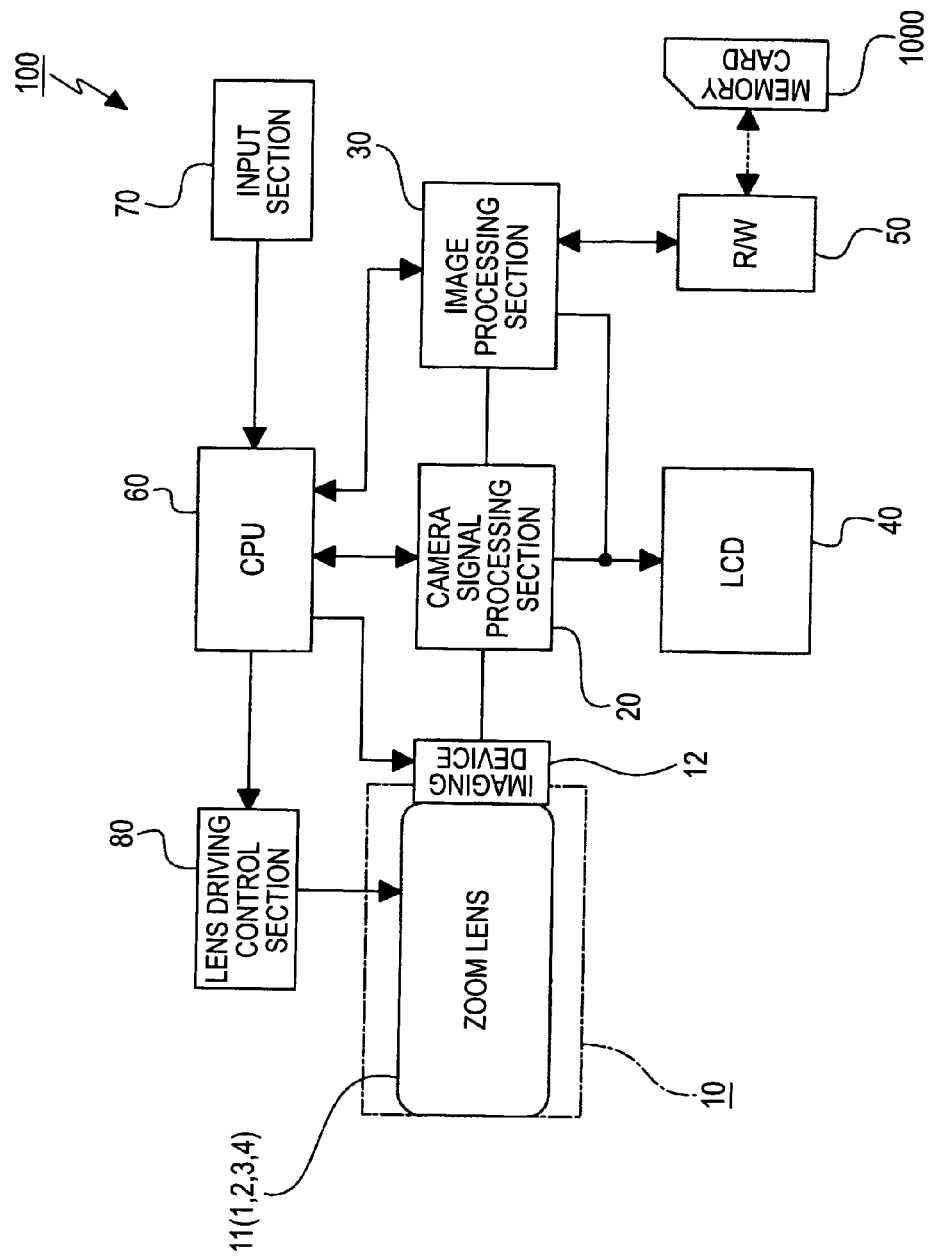
FIG. 30 is a block diagram illustrating an imaging apparatus according to an embodiment of the invention.

FIG. 30 shows a block diagram of a digital still camera of the imaging apparatus according to an embodiment of the invention.

The imaging apparatus (the digital still camera) 100 includes: a camera block 10 that has a function of taking an image; a camera signal processing section 20 that performs a signal processing such as an analog-to-digital conversion processing on a taken image signal; an image processing section 30 that performs a process of recording and reproducing the image signal; an LCD (Liquid Crystal Display) 40 that displays the taken image and the like; a R/W (reader/writer) 50 that performs writing and reading the image signal on the memory card 1000; a CPU (Central Processing Unit) 60 that controls the entire imaging apparatus; an input section 70, such as various switches, that is used for a user's desired operations; and a lens driving control section 80 that controls driving of the lens within the camera block 10.

The camera block 10 includes: an optical system including the zoom lens 11 (the zoom lenses 1, 2, 3, and 4 according to the embodiments of the invention); and an imaging device 12 including, for example, a CCD (Charge Coupled Device), a CMOS (Complementary Metal-Oxide Semiconductor) or the like.

The camera signal processing section 20 is configured to perform signal processes, such as a process of conversion into a digital signal, noise removal, image quality correction, and a process of conversion into luminance and chromatic difference signals, on the output signal which is output from the imaging device 12.

The image processing section 30 is configured to perform a process of coding for compression and decoding for decompression on an image signal based on a predetermined image data format, a process of conversion of data specification such as resolution, and the like.

The LCD 40 has a function to display various data such as a condition of the operation performed by a user with the aid of the input section 70 and a taken image.

The R/W 50 is configured to write image data, which is encoded by the image processing section 30, into the memory card 1000 and read the image data which is recorded on the memory card 1000.

The CPU 60 functions as a control processing section to control all the circuit blocks within the imaging apparatus 100, and controls the circuit blocks on the basis of the instruction input signals and the like from the input section 70.

The input section 70 includes, for example, a shutter release button for performing a shutter operation, a selection switch for selecting operation modes, and the like. The input section 70 is configured to output the instruction input signal in response to the user's operation to the CPU 60.

The lens driving control section 80 is configured to control a motor or the like, which is not shown in the drawing, for driving the lenses within the zoom lens 11 on the basis of the control signal from the CPU 60.

The memory card 1000 is, for example, a semiconductor memory which is removable from a slot connected to the R/W 50.

Next, operations of the imaging apparatus 100 will be described.

When in a photographing standby state, an image signal captured by the camera block 10 under the control of the CPU 60 is output to the LCD 40 through the camera signal processing section 20 so as to be displayed as a camera-through-image. Further, when the instruction input signal for zooming is input from the input section 70, the CPU 60 outputs a control signal to the lens driving control section 80, and moves predetermined lenses within the zoom lens 11 on the basis of the control of the lens driving control section 80.

When the not-shown shutter of the camera block 10 is operated by the instruction input signal from the input section 70, the captured image signal is output from the camera signal processing section 20 to the image processing section 30, is encoded for compression, and is converted into digital data of the predetermined data format. The converted data is output to the R/W 50 and is written in the memory card 1000.

For focusing, the lens driving control section 80 moves the predetermined lenses of the zoom lens 11 on the basis of the control signal received from the CPU 60, for example, when the shutter release button of the input section 70 is pressed halfway or pressed fully for recording (photography).

For reproduction of image data recorded in the memory card 1000, the R/W 50 reads out the predetermined image data from the memory card 1000 in response to the operation performed on the input section 70. The readout image data is decoded for decompression by the image processing section 30 and the reproduced image signal is then outputted to the LCD 40, thereby displaying the reproduced image.

The embodiment has described the case where the imaging apparatus according to the embodiment of the invention is applied to a digital still camera. However, the application range of the imaging apparatus is not limited to the digital still camera, and it may also be widely applied to a camera part or the like of a digital input/output apparatuses such as a digital video camera, a mobile phone equipped with a camera, and a PDA (Personal Digital Assistant) equipped with a camera.

The shapes of components and the numerical values described or shown in the above-mentioned embodiments are only illustrative examples of the embodiments for carrying out the invention, and they should not be interpreted as limiting the technical scope of the invention.

The present application contains subject matter related to that disclosed in Japanese Priority Patent Application JP 2009-164570 filed in the Japan Patent Office on Jul. 13, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising, in order from an object side to an image side:
    a first lens group that has a positive refractive power and remains stationary in a direction of an optical axis;
    a second lens group that has a negative refractive power and is movable on the optical axis so as to perform a zoom operation;
    a third lens group that has a positive refractive power and remains stationary in the direction of the optical axis during zooming and focusing;
    a fourth lens group that has a positive refractive power and is movable on the optical axis so as to correct fluctuation in imaging position and correct change in imaging position caused by change in object distance; and
    a fifth lens group that has a positive refractive power and remains stationary in the direction of the optical axis,
    wherein the fifth lens group includes, in order from the object side to the image side,
        a first lens that has a negative refractive power and remains stationary in the direction of the optical axis, and
        a second lens that has a positive refractive power and is movable in a direction perpendicular to the direction of the optical axis,
    wherein by moving the second lens of the fifth lens group in the direction perpendicular to the direction of the optical axis, an image formed on an image plane can be shifted in the direction perpendicular to the direction of the optical axis, and wherein the following conditional expressions (1), (2), and (4) are satisfied $$1.0 < f3/f4 < 2.0, \quad (1)$$

$$0.25 < |\beta 2w| < 0.4, \quad (2)$$

and $$1.1 < \beta 5 < 1.7, \quad (4)$$

where f3 is a composite focal length of the third lens group,
f4 is a composite focal length of the fourth lens group,
$\beta 2w$ is an imaging magnification of the second lens group in a wide-angle end state,
$\beta 5$ is an imaging magnification of the fifth lens group.

2. The zoom lens according to claim 1, wherein the following conditional expression (5) is satisfied $$0.3 < f5p/ft < 0.7, \quad (5)$$

where f5p is a focal length of the second lens of the fifth lens group, and
ft is a focal length of the whole lens system in a telephoto end state.

3. The zoom lens according to claim 2, wherein the following conditional expression (6) is satisfied $$-1.0 < f5n/f5p < -0.5, \quad (6)$$

where f5n is a focal length of the first lens of the fifth lens group.

4. The zoom lens according to claim 1, wherein the first lens and the second lens of the fifth lens group are made of resin, and the following conditional expressions (7) and (8) are satisfied $$\nu 5a < 42, \text{ and} \quad (7)$$

$$\nu 5b > 55, \quad (8)$$

where $\nu 5a$ is an Abbe number of the first lens of the fifth lens group at the d-line, and
$\nu 5b$ is an Abbe number of the second lens of the fifth lens group at the d-line.

5. An imaging apparatus comprising:

a zoom lens; and
an imaging device that converts an optical image, which is formed by the zoom lens, into an electric signal,
wherein the zoom lens includes, in order from an object side to an image side,
  a first lens group that has a positive refractive power and remains stationary in a direction of an optical axis,
  a second lens group that has a negative refractive power and is movable on the optical axis so as to perform a zoom operation,
  a third lens group that has a positive refractive power and remains stationary in the direction of the optical axis during zooming and focusing,
  a fourth lens group that has a positive refractive power and is movable on the optical axis so as to correct fluctuation in imaging position and correct change in imaging position caused by change in object distance, and
  a fifth lens group that has a positive refractive power and remains stationary in the direction of the optical axis,
wherein the fifth lens group includes, in order from the object side to the image side,
  a first lens that has a negative refractive power and remains stationary in the direction of the optical axis, and
  a second lens that has a positive refractive power and is movable in a direction perpendicular to the direction of the optical axis,
wherein by moving the second lens of the fifth lens group in the direction perpendicular to the direction of the optical axis, an image formed on an image plane can be shifted in the direction perpendicular to the direction of the optical axis, and
wherein the following conditional expressions (1), (2), and (4) are satisfied $$1.0 < f3/f4 < 2.0, \quad (1)$$

$$0.25 < |\beta 2w| < 0.4, \quad (2)$$

and $$1.1 < \beta 5 < 1.7, \quad (4)$$

where f3 is a composite focal length of the third lens group,
f4 is a composite focal length of the fourth lens group,
$\beta 2w$ is an imaging magnification of the second lens group in a wide-angle end state,
$\beta 5$ is an imaging magnification of the fifth lens group.

6. A zoom lens comprising, in order from an object side to an image side:

a first lens group that has a positive refractive power and remains stationary in a direction of an optical axis;
a second lens group that has a negative refractive power and is movable on the optical axis so as to perform a zoom operation;
a third lens group that has a positive refractive power and remains stationary in the direction of the optical axis during zooming and focusing;
a fourth lens group that has a positive refractive power and is movable on the optical axis so as to correct fluctuation in imaging position and correct change in imaging position caused by change in object distance; and
a fifth lens group that has a negative refractive power and remains stationary in the direction of the optical axis,
wherein the fifth lens group includes, in order from the object side to the image side,
  a first lens that has a negative refractive power and remains stationary in the direction of the optical axis, and
  a second lens that has a positive refractive power and is movable in a direction perpendicular to the direction of the optical axis,
wherein by moving the second lens of the fifth lens group in the direction perpendicular to the direction of the optical axis, an image formed on an image plane can be shifted in the direction perpendicular to the direction of the optical axis, and
wherein the following conditional expressions (1), (2), and (4) are satisfied $$1.0 < f3/f4 < 2.0, \quad (1)$$

$$0.25 < |2w| < 0.4, \quad (2)$$

and $$1.1 < \beta 5 < 1.7, \quad (4)$$

where
f3 is a composite focal length of the third lens group,
f4 is a composite focal length of the fourth lens group,
β2w is an imaging magnification of the second lens group in a wide-angle end state, and
β5 is an imaging magnification of the fifth lens group.

7. The zoom lens according to claim 6, wherein the following conditional expression (5) is satisfied.

$$0.3 < f5p/ft < 0.7, \quad (5)$$

where
f5p is a focal length of the second lens of the fifth lens group, and
ft is a focal length of the whole lens system in a telephoto end state.

8. The zoom lens according to claim 7, wherein the following conditional expression (6) is satisfied $$-1.0 < f5n/f5p < -0.5, \quad (6)$$

where
f5n is a focal length of the first lens of the fifth lens group.

9. The zoom lens according to claim 6, wherein the first lens and the second lens of the fifth lens group are made of resin, and the following conditional expressions (7) and (8) are satisfied $$v5a < 42, \text{ and} \quad (7)$$

$$v5b > 55, \quad (8)$$

where
v5a is an Abbe number of the first lens of the fifth lens group at the d-line, and
v5b is an Abbe number of the second lens of the fifth lens group at the d-line.

10. An imaging apparatus comprising:
a zoom lens; and
an imaging device that converts an optical image, which is formed by the zoom lens, into an electric signal,
wherein the zoom lens includes, in order from an object side to an image side,
a first lens group that has a positive refractive power and remains stationary in a direction of an optical axis,
a second lens group that has a negative refractive power and is movable on the optical axis so as to perform a zoom operation,
a third lens group that has a positive refractive power and remains stationary in the direction of the optical axis during zooming and focusing,
a fourth lens group that has a positive refractive power and is movable on the optical axis so as to correct fluctuation in imaging position and correct change in imaging position caused by change in object distance, and
a fifth lens group that has a negative refractive power and remains stationary in the direction of the optical axis,
wherein the fifth lens group includes, in order from the object side to the image side,
a first lens that has a negative refractive power and remains stationary in the direction of the optical axis, and
a second lens that has a positive refractive power and is movable in a direction perpendicular to the direction of the optical axis,
wherein by moving the second lens of the fifth lens group in the direction perpendicular to the direction of the optical axis, an image formed on an image plane can be shifted in the direction perpendicular to the direction of the optical axis, and
wherein the following conditional expressions (1), (2), and (4) are satisfied $$1.0 < f3/f4 < 2.0, \quad (1)$$

$$0.25 < |\beta 2w| < 0.4, \quad (2)$$

and $$1.1 < \beta 5 < 1.7, \quad (4)$$

where
f3 is a composite focal length of the third lens group,
f4 is a composite focal length of the fourth lens group,
β2w is an imaging magnification of the second lens group in a wide-angle end state,
β5 is an imaging magnification of the fifth lens group.

* * * * *